ns*US011234034B2*

United States Patent
Katsavounidis

(10) Patent No.: US 11,234,034 B2
(45) Date of Patent: Jan. 25, 2022

(54) TECHNIQUES FOR ENCODING A MEDIA TITLE VIA MULTIPLE ENCODERS

(71) Applicant: NETFLIX, INC., Los Gatos, CA (US)

(72) Inventor: Ioannis Katsavounidis, San Jose, CA (US)

(73) Assignee: NETFLIX, INC., Los Gatos, CA (US)

( * ) Notice: Subject to any disclaimer, the term of this patent is extended or adjusted under 35 U.S.C. 154(b) by 118 days.

(21) Appl. No.: 16/179,820

(22) Filed: Nov. 2, 2018

(65) Prior Publication Data

US 2020/0145709 A1  May 7, 2020

(51) Int. Cl.
 *H04N 21/2662* (2011.01)
 *H04N 21/2343* (2011.01)
 *H04N 21/238* (2011.01)

(52) U.S. Cl.
 CPC ... *H04N 21/2662* (2013.01); *H04N 21/23805* (2013.01); *H04N 21/234309* (2013.01); *H04N 21/234363* (2013.01)

(58) Field of Classification Search
 CPC ....... H04N 21/2662; H04N 21/234309; H04N 21/234363; H04N 21/23805
 See application file for complete search history.

(56) References Cited

U.S. PATENT DOCUMENTS

| | | | | |
|---|---|---|---|---|
| 10,116,721 B1 * | 10/2018 | LaPier | ............... | H04N 21/2343 |
| 10,523,978 B1 * | 12/2019 | Nielsen | ............. | H04N 21/2662 |
| 2011/0052087 A1 * | 3/2011 | Mukherjee | ............. | H04N 19/14 |
| | | | | 382/248 |
| 2013/0064305 A1 * | 3/2013 | Karlsson | ............... | H04N 19/30 |
| | | | | 375/240.26 |
| 2013/0329781 A1 * | 12/2013 | Su | ........................ | H04N 21/242 |
| | | | | 375/240.02 |
| 2013/0343450 A1 * | 12/2013 | Solka | ............... | H04N 21/25808 |
| | | | | 375/240.03 |

(Continued)

OTHER PUBLICATIONS

International Search Report for application No. PCT/US2019/059520 dated Mar. 27, 2020.

(Continued)

*Primary Examiner* — Randy A Flynn
(74) *Attorney, Agent, or Firm* — Artegis Law Group, LLP

(57) ABSTRACT

In various embodiments, a subsequence-based encoding application generates subsequences based on a source sequence associated with a media title. The subsequence-based encoding application then encodes both a first subsequence and a second subsequence across each of multiple configured encoders and at least one rate control value to generate, respectively, a first set of encoded subsequences and a second set of encoded subsequences. Notably, each configured encoder is associated with a combination of an encoder and a configuration, and at least two configured encoders are different from one another. Subsequently, the subsequence-based encoding application generates encoded media sequences based on the first set of encoded subsequences and the second set of encoded subsequences. Finally, the application selects a first encoded media sequence from the encoded media sequences based on a first target value for a media metric to subsequently stream to a first endpoint device during playback of the media title.

20 Claims, 11 Drawing Sheets

(56) References Cited

U.S. PATENT DOCUMENTS

| | | | |
|---|---|---|---|
| 2014/0282786 A1* | 9/2014 | Lajoie | H04N 21/4627 725/115 |
| 2016/0088050 A1* | 3/2016 | Einarsson | H04L 65/602 709/231 |
| 2017/0048536 A1 | 2/2017 | Forehand et al. | |
| 2017/0237987 A1* | 8/2017 | Seigneurbieux | H04N 21/23655 375/240.02 |
| 2017/0366833 A1 | 12/2017 | Amidei et al. | |
| 2019/0082238 A1* | 3/2019 | Sengupta | H04N 21/2343 |

OTHER PUBLICATIONS

Aaron et al., "Per-Title Encode Optimization", Retrieved from the Internet, URL:http:/ltechblog.netflix.com/2015/12/per-title-encode-optimization.html, Dec. 14, 2015, retrieved on May 12, 2016, 8 pages.

Wiegand et al., "Overview of the H.264/AVC Video Coding Standard," DOI: 10.1109/TCSVT.2003.815165, Circuits and Systems for Video Technology, IEEE Transactions, vol. 13, No. 7, Jul. 2003, pp. 560-576.

"Advanced video coding for generic audiovisual services", ITU-T Rec. H.264 and ISO/IEC 14496-10 (AVC), 2003, 282 pages.

"High effciency video coding", ITU-T Rec. H.265 and ISO/IEC 23008-2 (HEVC), 2013, 317 pages.

Grange et al., "VP9 Bitstream & Decoding Process Specification", Version 0.6, Retrieved from https://storage.googleapis.com/downloads.webmproject.org/docs/vp9/vp9-bitstream-specification-v0.6-20160331-draft.pdf, 2016, 171 pages.

Suehring, Karsten, "H.264/AVC software", http://iphome.hhi.de/suehring/tml/, retrieved May 17, 2020, 1 page.

"High Efficiency Video Coding (HEVC) | JCT-VC", Fraunhofer Heinrich Hertz Institute, https://hevc.hhi.fraunhofer.de, retrieved Apr. 17, 2020, 2 pages.

"webproject / libvpx", https://github.com/webmproject/libvpx, retrieved Apr. 17, 2020, 5 pages.

Bjontegaard, Gisle, "Calculation of average psnr differences between rd curves," ITU-T Q.6/SG16 VCEG 13th meeting, https://www.itu.int/wftp3/av-arch/video-site/0104_Aus/VCEG-M33.doc, 2001, 4 pages.

Katsavounidis, Ioannis, "NETFLIX—"El Fuente" video sequence details and scenes", Jul. 28, 2015, http://www.cdvl.org/documents/ElFuente_summary.pdf, 64 pages.

Katsavounidis, Ioannis, "NETFLIX—"Chimera" video sequence details and scenes", Nov. 2, 2015, https://www.cdvl.org/documents/NETFLIX_Chimera_4096x2160_Download_Instructions.pdf, 189 pages.

Wang et al., "Image Quality Assessment: From Error Visibility to Structural Similarity", DOI:10.1109/TIP.2003.819861, IEEE Transactions on Image Processing, vol. 13, No. 4, Apr. 2004, pp. 600-612.

Sheikh et al., "Image Information and Visual Quality", DOI:10.1109/TIP.2005.859378, IEEE Transactions on Image Processing, vol. 15, No. 2, Feb. 2006, pp. 430-444.

"Netflix / VMAF", https://github.com/Netflix/vmaf, retrieved Apr. 17, 2020, 4 pages.

Li et al., "Full-Reference Video Quality Assessment by Decoupling Detail Losses and Additive Impairments", DOI:10.1109/TCSVT.2012.2190473, Circuits and Systems for Video Technology, IEEE Transactions, vol. 22, No. 7, Jul. 2012, pp. 1100-1112.

Winkler, Stefan, "Analysis of Public Image and Video Databases for Quality Assessment", DOI:10.1109/JSTSP.2012.2215007, IEEE Journal of Selected Topics in Signal Processing, vol. 6, No. 6, Oct. 2012, pp. 616-625.

Cortes et al., "Support-Vector Networks", Machine Learning, vol. 20, 1995, pp. 273-297.

Li et al., "Toward A Practical Perceptual Video Quality Metric", Netflix Technology Blog, https://netflixtechblog.com/toward-a-practical-perceptual-video-quality-metric-653f208b9652, Jun. 6, 2016, 21 pages.

Katsavounidis, Ioannis, "Dynamic optimizer—a perceptual video encoding optimization framework", Netflix Technology Blog, https://netflixtechblog.com/dynamic-optimizer-a-perceptual-video-encoding-optimization-framework-e19f1e3a277f, Mar. 5, 2018, 22 pages.

Manohara et al., "Optimized shot-based encodes: Now streaming!", Netflix Technology Blog, https://netflixtechblog.com/optimized-shot-based-encodes-now-streaming-4b9464204830, Mar. 9, 2018, 9 pages.

Ortega et al., "Rate-Distortion Methods for Image and Video Compression", IEEE Signal Processing Magazine, vol. 15, No. 6, Nov. 1998, pp. 23-50.

"Mirror / x264", https://github.com/mirror/x264, retrieved May 17, 2020, 1 page.

"FFmpeg / FFmpeg", https://github.com/FFmpeg/FFmpeg, retrieved May 17, 2020, 3 pages.

"Videolan / x265", https://github.com/videolan/x265, retrieved May 17, 2020, 1 page.

"Eve-VP9 Maximize the Capabilities of VP9 for Your Video Streaming", Two Orioles, https://www.twoorioles.com/eve-vp9, retrieved May 17, 2020, 7 pages.

"Per-Title Encode Optimization", Netflix Technology Blog, https://netflixtechblog.com/per-title-encode-optimization-7e99442b62a2, Dec. 14, 2015, 13 pages.

Wang et al., "Videoset: A large-scale compressed video quality dataset based on JND measurement", http://dx.doi.org/10.1016/j.jvcir.2017.04.009, Journal of Visual Communication and Image Representation, vol. 46, 2017, pp. 292-302.

Katsavounidis et al., "Native resolution detection of video sequences," in SMPTE 2015 Annual Technical Conference and Exhibition, manuscript version dated Sep. 3, 2015, 26 pages.

Mareddy et al., "Simplifying Media Innovation at Netflix with Archer", Netflix Technology Blog, https://netflixtechblog.com/simplifying-media-innovation-at-netflix-with-archer-3f8cbb0e2bcb, Jun. 20, 2018, 13 pages.

* cited by examiner

TECHNIQUES FOR ENCODING A MEDIA TITLE VIA MULTIPLE ENCODERS

BACKGROUND

Field of the Various Embodiments

Embodiments of the present invention relate generally to encoding technology and, more specifically, to techniques for encoding a media title via multiple encoders.

Description of the Related Art

A typical media streaming service provides access to a library of media titles that can be viewed on a range of different endpoint devices. Each endpoint device may connect to the media streaming service under different connection conditions that affect bandwidth and latency. In addition, each different endpoint device may include different hardware for outputting the media title to end user(s). For example, a given endpoint device could include a display screen having a particular screen size and a particular screen resolution.

In many implementations, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that provides the best possible visual quality during playback of the media title on the endpoint device while avoiding playback interruptions due to buffering or re-buffering.

In some implementations, the endpoint application selects the particular encoded version of the media title based on a bitrate ladder. The bitrate ladder is designed to achieve a target visual quality during playback of a media title based on an available bandwidth. Each rung in the bitrate ladder specifies a different bitrate-resolution pair corresponding to a different pre-generated encoded version of the media title. To generate the encoded version of a media title corresponding to a given bitrate-resolution pair, the media content associated with the media title is sampled at the resolution to generate sampled media content. A rate control value is selected based on the bitrate and then an encoder is used to encode the sampled media content.

One drawback of the above "monolithic" encoding technique is that the complexity of the media content associated with a given media title oftentimes varies across the media title; whereas, the resolution and the rate control value used to encode the media content do not vary. As a result, encoding relatively simple portions of the media title may consume more computational and storage resources than what is necessary to meet the target visual quality. For example, a relatively simple portion of a media title could have the same visual quality regardless of whether that portion of media content is encoded using a bitrate of 560 kilobits per second (kbps) or using a bitrate of 3000 kbps. Among other things, such encoding inefficiencies waste computational and storage resources and increase the bandwidth required to stream encoded versions of media titles to endpoint devices.

In other implementations, to reduce these types of encoding inefficiencies, a media streaming service provider varies the resolution and the rate control value across the media title. Typically, a subsequence-based encoding application partitions the media title into different subsequences or sets of frames which are characterized by similar properties. The subsequence-based encoding application then configures an encoder to encode each subsequence numerous times at a variety of different resolutions and rate control values to generate encoded subsequences. Subsequently, the subsequence-based encoding application performs optimization operations to generate different optimized encoded versions of the media title. Each optimized encoded version of the media title includes a different combination of the encoded subsequences that span the length of the media title, and the resolution and/or rate control value may vary between the constituent encoded subsequences.

One drawback of the above "subsequence-based" encoding techniques is that a single encoder is used to generate the different encoded subsequences that make up the optimized encoded versions of the media title. The encoder could be, without limitation, an Advanced Video Codec (AVC) encoder, a High Efficiency Video Coding (HEVC) encoder, a VP9 encoder, etc. As a general matter, different encoders implement different encoding algorithms that make different trade-offs between quality and bitrate. The effectiveness of any given encoding algorithm varies based on the type and complexity of the source media content, the resolution, the rate control value, and the values for any number of "configuration" parameters. Consequently, when implementing subsequence-based encoding, the quality-bit rate trade-off effected by the single encoder can be sub-optimal for some of the encoded subsequences. In such cases, the encoding efficiencies actually realized from subsequence-based encoding techniques are reduced. As a result, the visual quality levels associated with encoded versions of a media title associated with certain target bitrates can be sub-optimal during playback despite having been generated using subsequence-based encoding techniques.

For example, empirical results show that when encoding synthesized (e.g., animated) media content at a given bitrate, an HEVC encoder usually outperforms a VP9 encoder. In other words, the visual quality associated with the encoded media content generated using the HEVC encoder is usually better than the visual quality associated with the encoded media content generated using the VP9 encoder. Similarly, when encoding natural media content at bitrates lower than 40 kbps, the HEVC encoder usually outperforms the VP9 encoder. By contrast, when encoding natural media content at bitrates higher than 40 kbps, the VP9 encoder usually outperforms the HEVC encoder. If a movie that includes both synthesized and natural media content were to be encoded using an HEVC encoder, then the natural portions of the movie encoded at bitrates higher than 40 kbps likely would be associated with sub-optimal levels of visual quality. However, if that movie were to be encoded using a VP9 encoder, then the synthesized portions of the movie encoded at all bitrates as well as the natural portions of the movie encoded at bitrates lower than 40 kbps likely would be associated with sub-optimal levels of visual quality.

As the foregoing illustrates, what is needed in the art are more effective techniques for encoding media titles.

SUMMARY

One embodiment of the present invention sets forth a computer-implemented method for encoding a media title. The method includes generating a plurality of subsequences based on a source sequence associated with a media title; encoding a first subsequence included in the plurality of subsequences across each configured encoder included in a plurality of configured encoders and at least one rate control value to generate a first plurality of encoded subsequences, where each configured encoder included in the plurality of configured encoders is associated with a combination of an encoder and a configuration, and at least two configured encoders included in the plurality of configured encoders are different from one another; encoding a second subsequence included in the plurality of subsequences across each configured encoder in the plurality of configured encoders and the at least one rate control value to generate a second plurality of encoded subsequences; generating a plurality of encoded media sequences based on the first plurality of encoded subsequences and the second plurality of encoded subsequences; and selecting a first encoded media sequence from the plurality of encoded media sequences based on a first target value for a media metric to subsequently stream to a first endpoint device during playback of the media title.

At least one technical advantage of the disclosed techniques relative to prior art solutions is that the disclosed techniques vary the encoder used when generating an encoded media sequence. More precisely, the disclosed techniques individually optimize the encoder, the resolution, and the rate control value used to encode each subsequence within a target encoded media sequence with respect to both the target metric and the subsequence. As a result, the disclosed techniques reduce the encoding inefficiencies typically associated with prior art monolithic encoding techniques as well as the encoding inefficiencies typically associated with prior art subsequence-based encoding techniques.

In particular, if the encoded media sequence corresponds to a target bitrate, then encoding different subsequences using different encoders can increase the overall visual quality of the optimized encoded media sequence. By contrast, if the encoded media sequence corresponds to a target visual quality score, then encoding different shots using different encoders can reduce the bandwidth required to stream the encoded media sequence to endpoint devices. These technical advantages provide one or more technological advancements over the prior art.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

DETAILED DESCRIPTION

Figure 1:
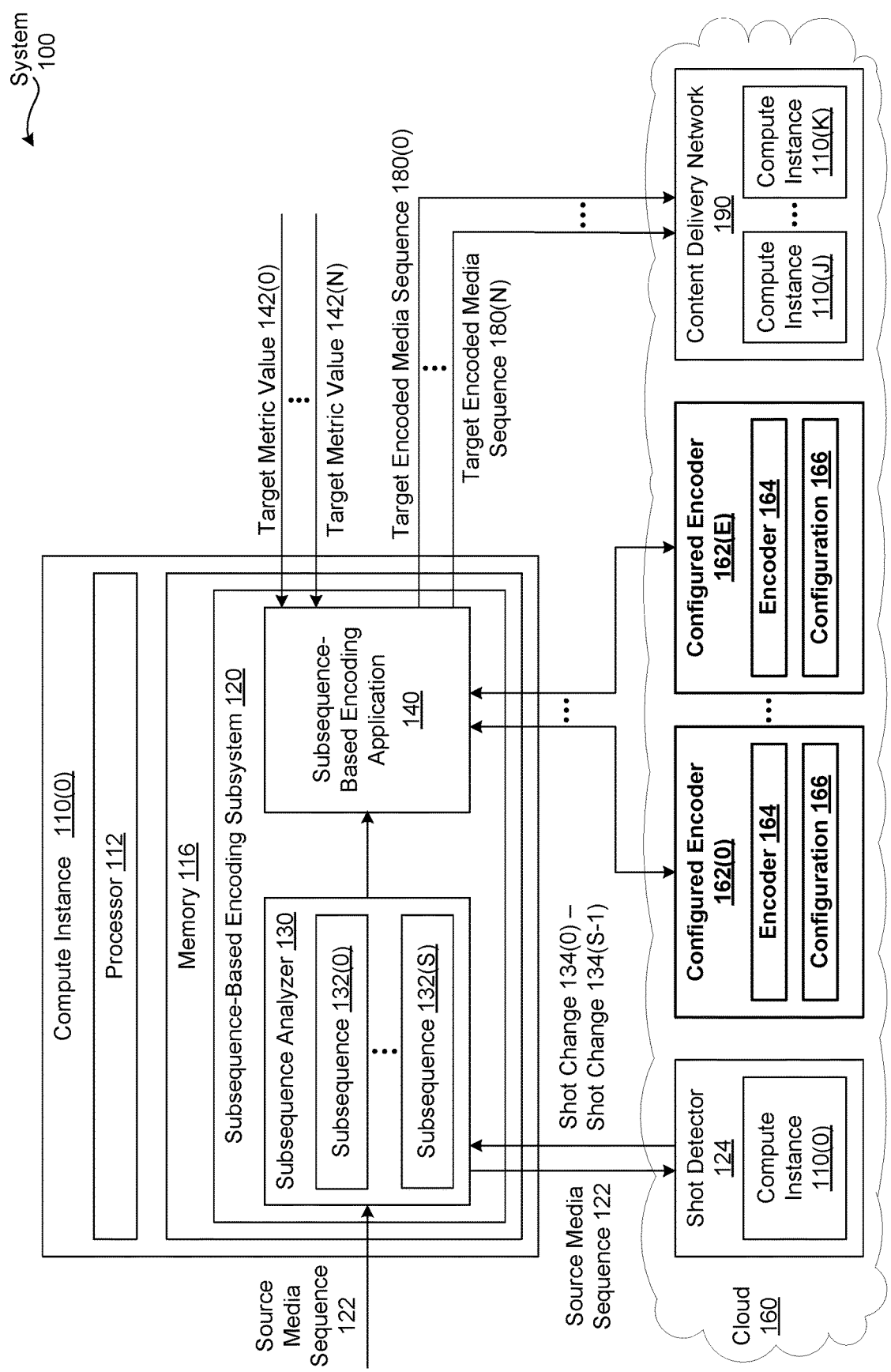
FIG. 1 is a conceptual illustration of a system configured to implement one or more aspects of the present invention.

In the following description, numerous specific details are set forth to provide a more thorough understanding of the various embodiments. However, it will be apparent to one of skilled in the art that the inventive concepts may be practiced without one or more of these specific details.

To optimize the overall visual experience that a media streaming service provides to viewers, the media streaming service provider oftentimes generates a bitrate ladder for each media title. The bitrate ladder for a given media title allows client-side endpoint devices to achieve a target visual quality during playback of the media title based on an available bandwidth. Each rung in the bitrate ladder specifies a different bitrate-resolution pair corresponding to a different pre-generated encoded version of the media title.

Some media streaming service providers use monolithic encoding techniques to generate the different encoded versions of the media title, where each encoded version of the media title is associated with a different bitrate. Namely, the resolution and a rate control value used to encode the media content associated with a given media title do not vary across the media title. However, because the complexity of the media content associated with a given media title typically varies across the media title, the resulting encoded versions of the media title are often associated with encoding inefficiencies. More specifically, encoding relatively simple portions of the media title may consume more computational and storage resources than are necessary to meet a target visual quality. Further, the bandwidth required to stream the encoded versions of the media title may be unnecessarily large.

For example, a movie could include relatively complex action portions and relatively simple monologues. The monologues could have the same visual quality regardless of whether the monologues are encoded using a bitrate of 3000 kilobits per second (kbps) or encoded using a bitrate of 560 kbps. By contrast, the required resources (e.g., computational resources, storage resources, bandwidth, etc.) associated with encoding the monologues using a bitrate of 3000 kbps exceed the required resources associated with encoding the monologues using a bitrate of 560 kbps. Accordingly, encoding the entire movie using a bitrate of 3000 kbps needlessly wastes computational and storage resources and unnecessarily increases the bandwidth required to stream the encoded version of the movie to endpoint devices.

To reduce the encoding inefficiencies typically associated with monolithic encoding techniques, some media streaming service providers use a conventional subsequence-based encoding application to generate different optimized encoded versions of a given media title. The conventional subsequence-based application varies the resolution and rate control value across the media title based on a target metric value, such as a target visual quality or a target bitrate. In this fashion, each optimized encoded version of the media title is associated with a different target metric value.

Typically, the conventional subsequence-based encoding application partitions the media title into different subsequences, where each subsequence is a shot that includes media content captured continuously from a given camera or other capture point. The conventional subsequence-based encoding application then encodes each subsequence numerous times at a variety of different combinations of resolution and bitrate to generate encoded subsequences. Subsequently, the conventional subsequence-based encoding application performs optimization operations to generate different optimized encoded versions of the media title. Each optimized encoded version of the media title includes a different combination of the encoded subsequences that span the length of the media title, and the resolution and rate control value may vary between the constituent encoded subsequences. As a result, the conventional subsequence-based encoding application reduces the encoding inefficiencies typically associated with monolithic encoding techniques described above.

One drawback of these type of subsequence-based encoding techniques is that a single encoder is used to generate the different encoded subsequences that make up the "optimized" encoded versions of the media title. Some examples of encoders include, without limitation, an Advanced Video Codec (AVC) encoder, a High Efficiency Video Coding (HEVC) encoder, a VP9 encoder, and so forth. As a general matter, the effectiveness of any given encoder varies based on the type and complexity of the media content as well as the resolution and rate control value used to encode the media content.

For example, when encoding synthesized (e.g., animated) media content at a given bitrate, an HEVC encoder usually outperforms a VP9 encoder. In other words, the visual quality associated with the encoded media content generated using the HEVC encoder is usually better than the visual quality associated with the encoded media content generated using the VP9 encoder. Similarly, when encoding natural media content at relatively low bitrates, the HEVC encoder usually outperforms the VP9 encoder. By contrast, when encoding natural media content at relatively high bitrates, the VP9 encoder usually outperforms the HEVC encoder.

Because a single encoder is used to generate the different subsequences, the encoder used to generate the target encoded media sequences does not vary across the media title. Consequently, when implementing subsequence-based encoding, the visual quality provided during playback of the associated media title on the endpoint devices is limited by the performance of a single encoder. For example, suppose that a movie "Mixed" were to include both synthesized and natural media content. If the subsequences were to be encoded using an HEVC encoder, then an optimized encoded version of the media title associated with a relatively high target bitrate likely would be associated with sub-optimal levels of visual quality during playback of natural portions of the movie. Conversely, if the subsequences were to be encoded using a VP9 encoder, then an optimized encoded version of the media title associated with a relatively low target bitrate would likely be associated with sub-optimal levels of visual quality during playback of the entire movie.

With the disclosed techniques, however, a media streaming service provider can vary the encoder used to encode subsequences when performing subsequence-based encoding of a given media title. Because the resulting encoded versions of the media title can include encoded subsequences associated with varying combinations of configured encoder, resolution, and rate control value, the disclosed techniques do not unnecessary limit the reduction in encoding inefficiencies associated with monolithic techniques.

In some embodiments, for each subsequence included in a media title, the subsequence-based encoding application generates multiple encoded subsequences based on multiple encoding points. Each encoding point specifies a different combination of an encoder, a resolution, and a rate control value. To generate the encoded subsequence associated with a particular subsequence and a particular encoding point, the subsequence encoding application causes the encoder specified by the encoding point to encode the subsequence at the resolution and rate control value specified by the encoding point. After generating the various encoded subsequences, the subsequence-based encoding application performs optimization operations across the encoded subsequences to generate different optimized encoded versions of the media title. Each optimized encoded version of the media title includes a different combination of the encoded subsequences that span the length of the media title. Notably, not only the resolution and rate control value may vary between the constituent encoded subsequences, but also the encoder may vary between the constituent encoded subsequences. As a result, the subsequence-based encoding application comprehensively reduces the encoding inefficiencies typically associated with monolithic encoding techniques described above.

One advantage and technological advancement of the disclosed techniques relative to prior art approaches is that each subsequence in an optimized encoded version of the media title is encoded using a combination of resolution, rate control value, and encoder that are optimized for the subsequence and the associated target metric value. Consequently, the overall visual quality levels associated with the optimized encoded versions of the media title are usually increased relative to prior art approaches. For example, an optimized encoded version of the media title that is streamed to an endpoint device based on a relatively high available bandwidth could include subsequences encoded using a highest available resolution, a highest available bitrate, and a combination of encoders. More specifically, primarily animated subsequences could be encoded using an HEVC encoder and primarily natural subsequences could be encoded using a VP9 encoder. Because the encoder used to encode the media content varies in an optimized fashion across the media title, the overall visual quality associated with the optimized encoded version of the media title would be higher than the overall visual quality that would be associated with an ostensible optimized encoded version of the media title encoded using a single encoder.

System Overview

FIG. 1 is a conceptual illustration of a system 100 configured to implement one or more aspects of the present invention. As shown, the system 100 includes, without limitation, any number of compute instances 110 and a cloud 160. In general, the cloud 160 contains encapsulated shared resources, software, data, etc. For explanatory purposes, multiple instances of like objects are denoted with reference numbers identifying the object and parenthetical numbers identifying the instance where needed.

Any number of the compute instances 110 may reside outside the cloud 160 while other compute instances 110 may reside inside the cloud 160. In various embodiments, any number of the components of the system 100 may be distributed across multiple geographic locations. Further, any number of the components of the system 100 may be included in or distributed across one or more stand-alone devices, distributed computing environments, or clouds 160 in any combination.

As shown, each of the compute instances 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. In alternate embodiments, each of the compute instances 110 may include any number of processors 112.

The memory 116 stores content, such as software applications and data, for use by the processor 112 of the compute instance 110. The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 are configured to implement one or more applications. For explanatory purposes only, each application is depicted as residing in the memory 116 of a single compute instance 110 and executing on a processor 112 of the single compute instance 110. However, as persons skilled in the art will recognize, the functionality of each application may be distributed across any number of other applications that reside in the memories 116 of any number of compute instances 110 and execute on the processors 112 of any number of compute instances 110 in any combination. Further, the functionality of any number of applications may be consolidated into a single application or subsystem.

Although not shown, a media streaming service provides access to a library of media titles that can be viewed on a range of different endpoint devices. The library of media titles includes without limitation, the media title associated with the source media sequence 122. Each endpoint device may connect to the media streaming service under different connection conditions that affect, without limitation, bandwidth and latency. In addition, each different endpoint device may include different hardware for outputting the media title to end user(s). For example, a given endpoint device could include a display screen having a particular screen size and a particular screen resolution.

As described previously herein, in many embodiments, an endpoint device that connects to a media streaming service executes an endpoint application that determines, for a given media title, an appropriate encoded version of the media title to stream to the endpoint device based on the connection conditions and the properties of the endpoint device. More specifically, the endpoint application attempts to select a particular encoded version of the media title that is associated with the best visual quality during playback of the media title on the endpoint device while avoiding playback interruptions due to buffering or re-buffering.

The compute instances 110 are configured to generate encoded versions of media titles for streaming. More precisely, the compute instances 110 are configured to generate target encoded media sequences 180(1)-180(N) for the source media sequence 122. The source media sequence 122 includes, without limitation, any amount and type of media content that is associated with a media title. Examples of media content include, without limitation, any portion (including all) of feature length films, episodes of television programs, and music videos, to name a few. Each of the target encoded media sequences 180 is a different pre-generated encoded version of the media title and includes, without limitation, encoded media content derived from the media content included in the source media sequence 122.

The target encoded media sequences 180(0)-180(N) are associated with, respectively, target metric values 142(0)-142(N). Each of the target metric values 142 is a different value for a media metric. The media metric may be any measurement that corresponds to one or more properties of encoded video content, video content, audio content, and/or encoded audio content. In some embodiments, the media metric is a bitrate. In alternative embodiments, the media metric is a visual quality metric. Example of visual quality metrics include, without limitation, a peak signal-to-noise-ratio PSNR), a linear video multimethod assessment fusion ((VMAF) metric, and a harmonic VMAF (VMAFh), to name a few.

As described in detail previously herein, the complexity and type of the video content associated with a given media title oftentimes varies across the media title. Using conventional monolithic encoding techniques, the resolution, a rate control value, and the encoder used to encode the video content do not vary across the media title. As referred to herein a "rate control value" is a value for a rate control parameter used to specify how an encoder is to allocate bits when performing encoding operations on media content in an associated rate control mode. One example of a rate control parameters is a quantization parameter (QP). As a result, encoding relatively simple portions of the media title may consume more computational and storage resources than what is necessary to meet the target visual quality. Among other things, such encoding inefficiencies waste computational and storage resources and increase the bandwidth required to stream encoded versions of media titles to endpoint devices.

To reduce these types of encoding inefficiencies, conventional subsequence-based encoding techniques generate encoded versions of the video content in which the resolution and the rate control value vary across the media title. However, one limitation of conventional subsequence-based encoding techniques is that the encoder used to encode the video content does not vary across the media title. Some examples of common types of encoders include, without limitation, Advanced Video Codec (AVC), High Efficiency Video Coding (HEVC), and VP9. In general, different encoders implement different encoding algorithms that represent different trade-offs between quality and bitrate. The effectiveness of any given encoding algorithm varies based on the type and complexity of the source media content, the resolution, the rate control value, and any number of additional "configuration" parameters.

Consequently, when implementing conventional subsequence-based encoding, the quality-bit rate trade-off effected by the single encoder can be sub-optimal for some of the encoded subsequences. In such cases, the encoding efficiencies actually realized from subsequence-based encoding techniques are reduced. As a result, the visual quality associated with encoded versions of a media title associated with certain target bitrates can be sub-optimal during playback despite having been generated using subsequence-based encoding techniques.

In particular, the encoded version of a media title associated with a certain target bitrate can be associated with a sub-optimal level of visual quality during playback of the media title on the endpoint device despite having been generated using conventional subsequence-based encoding techniques.

Encoding Individual Subsequences Using Multiple Encoders

To comprehensively reduce the encoding inefficiencies typically associated with monolithic encoding techniques, the system 100 includes, without limitation, any number of configured encoders 162 and a subsequence-based encoding subsystem 120. The configured encoders 162 reside in the cloud 160. As described in greater detail in conjunction with FIG. 2, each of the configured encoders 162 includes, without limitation, an encoder 164 and a configuration 166.

The encoder 164(x) performs encoding operations concurrently, sequentially, or any combination thereof, via any number of computer instances 110. In alternative embodiments, the encoder 164(x) may be included in a coder/decoder (codec). The configuration 166(x) specifies the values for any number and type of parameters that customize the encoder 164(x). The parameters associated with the configuration 166(x) are also referred to herein as "configuration parameters." In general, a configuration parameter may be any parameter, option, mode, setting, etc., that impacts the encoding operations performed by the encoder 164(x). Examples of configuration parameters include, without limitation, a profile level, an analysis level, a search level, a psycho-visual option, a performance option, a tuning option, and so forth.

The subsequence-based encoding subsystem 120 resides in the memory 116 of the compute instance 110(0) and executes on the processor 112 of the compute instance 110(0). The subsequence-based encoding 120 subsystem includes, without limitation, a subsequence analyzer 130 and a subsequence-based encoding application 140. The subsequence analyzer 130 partitions the source media sequence 122 into any number of subsequences 132(0)-132(S). The subsequences 132 are non-overlapping, contiguous sets of frames that, together, span the source media sequence 122. Each set of frames may represent a variety of different constructs, including a group of pictures (GOP), a sequence of frames, a plurality of sequences of frames, and so forth. For instance, in some embodiments, each subsequence 132 is a different shot included in the source media sequence 122. As referred to herein, a "shot" is a sequence of frames that usually have similar spatial-temporal properties and run for an uninterrupted period of time.

Upon receiving the source media sequence 122, the subsequence analyzer 130 performs any number of analysis operations on the source media sequence 122 to determine the subsequences 132 based on any number and type of criteria. For instance, in various embodiments, the subsequence analyzer 130 may be configured to identify sets of frames for which a consistency metric lies within a specified range. In other embodiments, and as depicted in FIG. 1, the subsequence analyzer 130 determines the subsequences 132 based on any number of shot changes 134.

More specifically, the subsequence analyzer 130 transmits the source media sequence 122 to a shot detector 124 that resides in the cloud 160. The shot detector 124 executes any number of shot detection algorithms based on the source media sequence 122 to identify the shot changes 134. Some examples of shot detection algorithms include, without limitation, a multi-scale sum-of-absolute-differences algorithm, a motion-compensated residual energy algorithm, a histogram of differences algorithm, a difference of histograms algorithm, and so forth. Each of the shot changes 134 specifies a boundary between a different pair of shots. The shot detector 124 then transmits the shot changes 134 to the subsequence analyzer 130. Subsequently, the subsequence analyzer 130 performs partitioning operations on the source media sequence 122 based on the shot changes 134 to determine the subsequences 132.

In some embodiments, the subsequence analyzer 130 and/or the subsequence-based encoding subsystem 120 may perform any number type of additional operations as part of generating the subsequences 134. For instance, in various embodiments, the subsequence analyzer 130 removes extraneous pixels from the source media sequence 122. For example, the shot analyzer 130 could remove pixels included in black bars along border sections of the source media sequence 122.

In various embodiments, the subsequence-based encoding subsystem 120 ensures that the initial frame of each subsequence 132 is encoded as a key frame during encoding operations. As a general matter, a "key frame" and all subsequent frames from the same subsequence 132 that are included in an encoded media sequence are decoded independently of any proceeding frames included the encoded media sequence.

The subsequence-based encoding subsystem 120 may ensure that the different initial frames of the different subsequences 132 are encoded as key frames in any technically feasible fashion. For instance, in some embodiments, the subsequence-based encoding application 140 configures the configured encoders 162 to encode frames as key frames based on a key frame location list (not shown in FIG. 1) when encoding media content. In other embodiments, the subsequence-based encoding application 140 and/or the configured encoders 162 may perform any number of encoding operations to encode the different initial frames of the different subsequences 132 as key frames when encoding media content.

As persons skilled in the art will recognize, during playback, the media title associated with the source media sequence 122 is switchable between decoded versions of different target encoded media sequences 180 at aligned key frames to optimize a viewing experience based on any number of relevant criteria. Examples of relevant criteria include the current connection bandwidth, the current connection latency, the content of the upcoming subsequence 132, and the like.

As shown, for each of the target metric values 142(t), the subsequence-based encoding application 140 generates the target encoded media sequence 180(t) based on the subsequences 132, the configured encoders 162, and the target metric value 142(t). Each of the target encoded media sequences 180 includes, without limitation, S+1 encoded subsequences (not shown in FIG. 1) that are associated, respectively, with the subsequences 132(0)-132(S). Each of the encoded subsequences includes encoded media content derived from the media content included in the associated subsequence 132.

Figure 3:
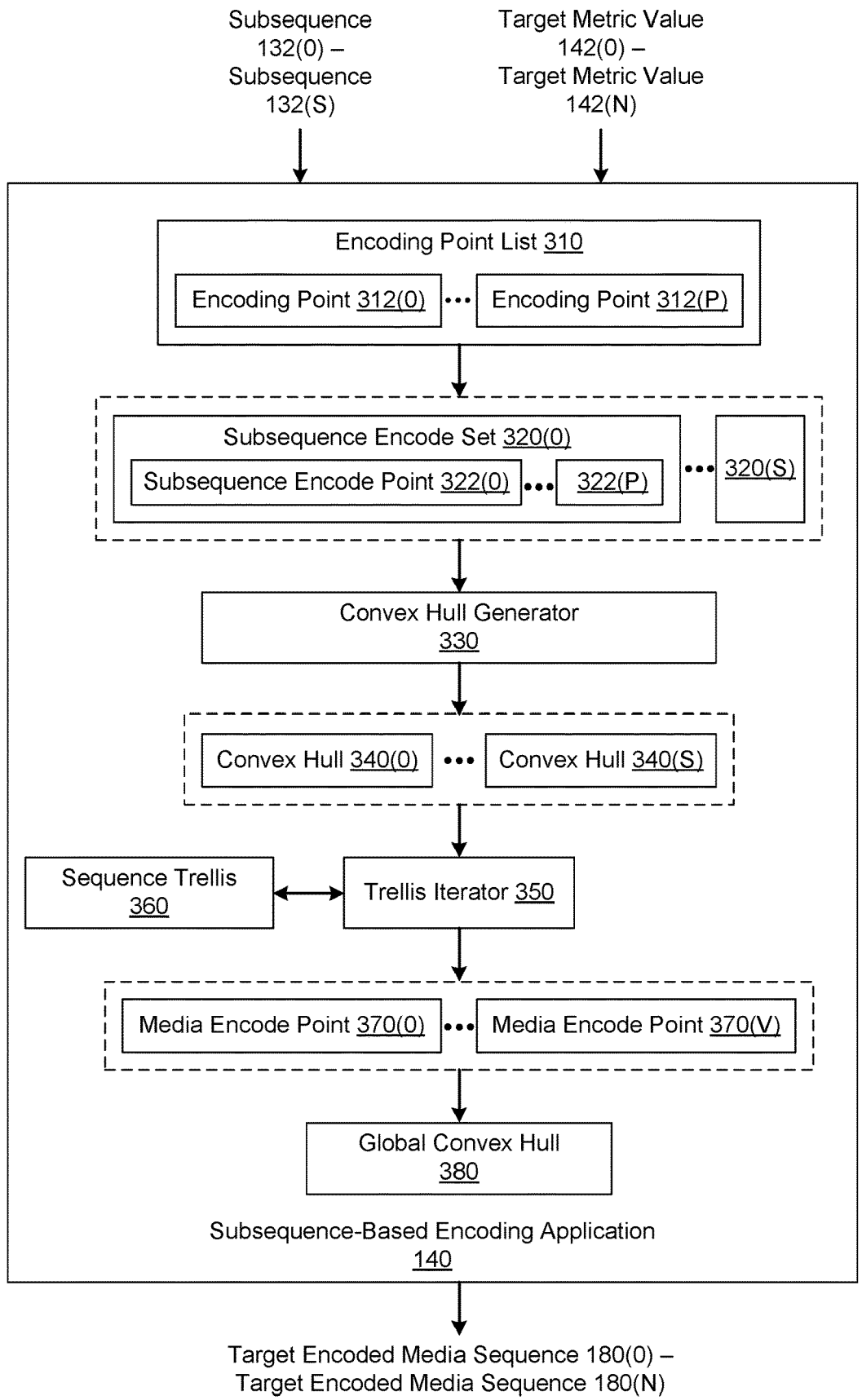
FIG. 3 is a more detailed illustration of the subsequence-based encoding application of FIG. 1, according to various embodiments of the present invention.

As described in greater detail in conjunction with FIG. 3, for each of the subsequences 132, the subsequence-based encoding application 140 generates multiple encoded subsequences based on an encoding point list. The encoding point list may include any number of encoding points. Each encoding point includes, without limitation, an encoder selection, a resolution, and a rate control value. The encoder selection specifies one of the configured encoders 162. The configured encoder 162 specified via the encoder selection included in a given encoding point is also referred to herein as the configured encoder 162 associated with the encoding point.

To generate the encoded subsequence corresponding to a given subsequence 132 and a given encoding point, the subsequence-based encoding application 140 performs sampling operations on the subsequence based on the resolution to generate a sampled subsequence. The subsequence-based encoding application 140 then uses the configured encoder 162 associated with the encoding point to encode the sampled subsequence at the rate control value to generate the encoded subsequence. In alternative embodiments, the subsequence-based encoding application 140 may generate the encoded subsequences in any technically feasible fashion.

In various embodiments, the subsequence-based encoding application 140 may perform sampling operations and encoding operations at any level of granularity (e.g., per frame, per subsequence 132, per source media sequence 122, etc.) in any combination and in any technically feasible fashion. For instance, in some embodiments, the subsequence-based encoding application 140 may perform sampling operations on the source media sequence 122 based on a given resolution to generate a sampled media sequence. Subsequently, for each encoding point associated with the resolution, the subsequence-based encoding application 140 may configure the associated configured encoder 162 to encode the sampled media content corresponding to the associated subsequence 132 at the associated rate control value. In the same or other embodiments, the system 100 may include a sampling application, and the subsequence-based encoding application 140 may configure the sampling application to perform sampling operations.

For each encoded subsequence, the subsequence-based encoding application 140 computes a bitrate, a quality score, and a distortion level. The subsequence-based encoding application 140 may compute the bitrate, the quality score, and the distortion level for a given encoded subsequence in any technically feasible fashion. For each encoded subsequence, the subsequence-based encoding application 140 then generates a subsequence encode point (not shown in FIG. 1). As described in greater detail in conjunction with FIG. 5, each subsequence encode point includes, without limitation, the encoded subsequence, the associated encoding point, the bitrate of the encoded subsequence, the quality score of the encoded subsequence, and the distortion level of the encoded subsequence.

For each of the subsequences 132(x), the subsequence-based encoding application 140 generates a different convex hull based on the subsequence encode points associated with the subsequence 132(x). In this fashion, the convex hull associated with a given subsequence 132(x) includes any number of the subsequence encode points associated with the subsequence 132(x). In general, for a given subsequence 132, the subsequence encode points included in the associated convex hull minimize the bitrate for different distortion levels.

The subsequence-based encoding application 140 then evaluates the convex hulls across all of the subsequences 132 to determine subsequence encode lists (not shown in FIG. 1). As described in greater detail in conjunction with FIGS. 7 and 8A-D, each subsequence encode list specifies subsequence encode points for the different subsequences 132. For each subsequence encode list, the subsequence-based encoding application 140 aggregates the different encoded subsequences included in the specified subsequence encode points to generate an encoded media sequence. For each encoded media sequence, the subsequence-based encoding application 140 then generates a media encode point that includes the encoded media sequences, the associated subsequence encode list, an overall bitrate for the encoded media sequence, and an overall distortion level for the encoded shot media sequence.

Subsequently, the subsequence-based encoding application 140 generates a global convex hull based on the media encode points. In general, for the source media sequence 122, each of the media encode points included in the global convex hull minimizes the overall bitrate for a different overall distortion level. For each of the target metric values 142(t), the subsequence-based encoding application 140 generates the target media sequence 180(t) based on the global convex hull. More precisely, to generate the target media sequence 180(t), the subsequence-based encoding application 140 selects an optimized media encode point that is included in the global convex hull based on the target metric value 142(t). The subsequence-based encoding application 140 then sets the target encoded media sequence 180(t) equal to the encoded media sequence included in the selected optimized video encode point.

In alternative embodiments, the subsequence-based encoding application 140 implements iterative techniques in which the subsequence-based encoding application 140 repeatedly generates the global convex hull prior to generating the target encoded media sequences 180. More specifically, the subsequence-based encoding application 140 initially generates a relatively sparse encoding point list. The subsequence-based encoding application 140 generates the global convex hull based on the encoding point list, determines additional encoding points based on the convex hull, and adds the additional encoding points to the encoding point list 310.

The subsequence-based encoding application 140 continues to re-generate the global convex hull 380 based on the expanded encoding point list and then add additional encoding points to the encoding point list based on the re-generated global convex hull until a desired convergence criterion is reached. Finally, the subsequence-based encoding application generates the target encoded media sequences 180 based on the most recently generated convex hull. In the same or other embodiments, the subsequence-based encoding application 140 may generate and/or modify a different encoding point list for each of the different subsequences 132. Notably, the number of encoding points in one encoding list may differ from the number of encoding points in other encoding lists After the subsequence-based encoding application 140 generates the target encoded media sequences 180(0)-180(N), the subsequence-based encoding application 140 transmits the target encoded media sequences 180 to a content delivery network (CDN) 190 for distribution to endpoint devices. In alternative embodiments, the subsequence-based encoding application 140 may be configured to identify each of the individual encoded subsequences that are included in the target encoded media sequences 180. The subsequence-based encoding application 140 may then transmit the identified encoded subsequences to the CDN 190 for distribution to endpoint devices.

In some embodiments, as part of delivering the target media sequence 180(x), the subsequence-based encoding application 140 determines whether the target media sequence 180(x) is associated with multiple encoding standards. As referred to herein, an "encoding standard" is a set of criteria with which each associated encoder complies. For example, an HEVC encoder and an HM encoder are both associated with an "HEVC encoding standard." An AVC encoder and a JM codec are both associated with an "AVC encoding standard." A VP9 encoder and a libvpx encoder are both associated with a "VP9 encoding standard."

If a given target media sequence 180(x) includes encoded subsequences 132 that were generated using configured encoders 162 associated with different encoding standards, then the target media sequence 180(x) is associated with multiple encoding standards. Otherwise, the target media sequence 180(x) is associated with a single encoding standard. If the subsequence-based encoding application 140 determines that the target encoded media sequence 180(x) is associated with multiple encoding standards, then the subsequence-based encoding application 140 may perform any number and type of notification operations. For instance, in some embodiments, the subsequence-based encoding application 140 generates one or more system-level signals. The system-level signals enable decoders receiving the target media sequence 180(x) to properly process the different encoded subsequences 530 included in the target media sequence 180(x). In the same or other embodiments, the subsequence-based encoding application 140 may deliver metadata indicating that the target media sequence 180(x) is associated with multiple encoding standards to the CDN 190 for subsequent delivery to endpoint devices.

In alternative embodiments, the subsequence-based encoding application 140 may cause the target encoded media sequences 180 and/or any number of the encoded subsequences to be delivered to endpoint devices in any technically feasible fashion. In the same or other embodiments, any amount and type of the functionality associated with the subsequence-based encoding application may be implemented in or distributed across any number of compute instances 110 and/or any number of endpoint devices, in any technically feasible fashion.

For instance, in some embodiments, the subsequence-based encoding application 140 delivers metadata to client applications executing on endpoint devices. Metadata includes, without limitation, metrics associated with encoded video content at any level of granularity. Example of metadata could include bitrates and quality metrics associated with one or more of the encoded subsequences and/or overall bitrates and overall quality metrics associated with one or more of the encoded media sequences. The client applications may perform any type and amount of adaptive streaming operations based on the metadata in any technically feasible fashion.

In one scenario, a user configures a video player application to stream a movie to a laptop. The subsequence-based encoding application 140 transmits the metadata associated with four different target encoded media sequences 180(0-3) to the video player application. The metadata indicates that the target encoded media sequence 180(3) is associated with the highest bitrate and the highest visual quality, while the target encoded media sequence 180(0) is associated with the lowest bitrate and the lowest visual quality. At any given time, the video player application selects the encoded media sequence 180 that is associated with the highest available visual quality during playback of the movie while avoiding playback interruptions due to rebuffering.

Based on an initial available bandwidth and the metadata, the video player application configures the subsequence-based encoding application 140 to begin streaming the encoded media sequence 180(3) to the video player application. In this fashion, the video player application provides the highest available visual quality during playback of the movie. In general, because of internet traffic, especially during peak times during the day, connection conditions can change quickly and become quite variable. In the described scenario, after ten minutes of playback, the available bandwidth decreases dramatically.

Based on the reduced bandwidth and the metadata, the video player application configures the subsequence-based encoding application 140 to dynamically switch between the target encoded media sequence 180(3) and the target encoded media sequence 180(0). At the next shot boundary, the subsequence-based encoding application 140 begins streaming the target encoded media sequence 180(0) instead of the target encoded media sequence 180(3) to the video player application. Although the video player application is no longer able to provide the highest available visual quality during playback of the movie, the video player application successfully avoids playback interruptions due to rebuffering.

For explanatory purposes only, the techniques described herein are described in the context of video encoding. However, as persons skilled in the art will recognize, the techniques described herein may be modified to optimize audio encoding instead of or in addition to video encoding. For instance, in some embodiments, an audio track may be partitioned into "audio scenes." The audio scenes may be sampled via audio rendering hardware. The sampled audio scenes may be encoded via an audio encoder that is configured via a quantization parameter and/or bitrate settings. The quality scores of the encoded audio scenes may be computed via a perceptual audio quality metric, such as the Perceptual Evaluation of Audio Quality (PEAQ) algorithm. Notably, the audio encoder, any number of associated configuration parameters, the resolution and/or a rate control value may be optimized for each audio scene based on any of the techniques described herein in any combination.

Further, although the techniques described herein are described in the context of media streaming, the techniques described herein may be modified to optimize encoding for any type of media consumption. For example, the techniques may be altered to optimize encoding for online video gaming, screen-content sharing, two-way video conferencing, electronic communication, etc.

Note that the techniques described herein are illustrative rather than restrictive, and may be altered without departing from the broader spirit and scope of the invention. Many modifications and variations on the functionality provided by the subsequence-based encoding subsystem 120, the subsequence analyzer 130, the subsequence-based encoding application 140, the shot detector 124, the configured encoders 162, and the content delivery network 190 will be apparent to those of ordinary skill in the art without departing from the scope and spirit of the described embodiments. As a general matter, the techniques outlined herein are applicable to generating an encoded media sequence using at least two different configured encoders in any technically feasible fashion.

It will be appreciated that the system 100 shown herein is illustrative and that variations and modifications are possible. For example the functionality provided by the subsequence-based encoding subsystem 120, the subsequence analyzer 130, the subsequence-based encoding application 140, the shot detector 124, the configured encoders 162, and the content delivery network 190 as described herein may be integrated into or distributed across any number of software applications (including one), hardware devices (e.g., a hardware-based encoder), and any number of components of the system 100. Further, the connection topology between the various units in FIG. 1 may be modified as desired.

Figure 2:
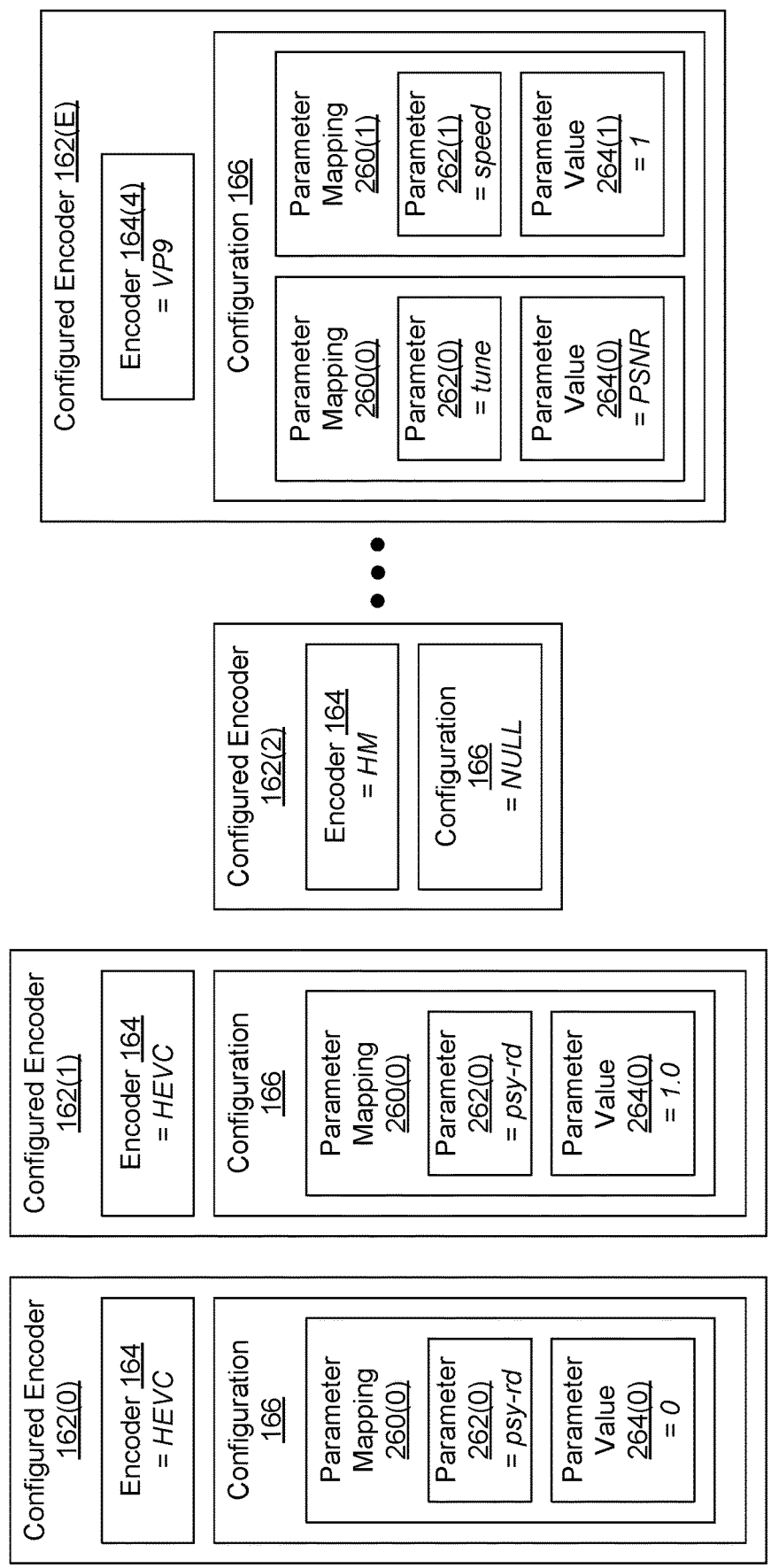
FIG. 2 is a more detailed illustration of the configured encoders of FIG. 1, according to various embodiments of the present invention.

FIG. 2 is a more detailed illustration of the configured encoders 162 of FIG. 1, according to various embodiments of the present invention. As shown, each of the configured encoders 162(x) includes, without limitation, the encoder 164(x) and the configuration 166(x). The encoder 164(x) performs encoding operations concurrently, sequentially, or any combination thereof, via any number of computer instances 110. The configuration 166(x) specifies the values for any number and type of parameters that customize the encoding operations performed by the encoder 164(x).

The configuration 166(x) includes, without limitation, any number of parameters mappings 260. Each parameter mapping 260(y) includes, without limitation, a parameter 262(y), and a parameter value 264(y) that is a specific value for the parameter 262(y). Each encoder 164 may be associated with any number of parameters 262(y), where the associated parameter value 264(y) controls the encoding operations performed by the encoder 164 in a defined manner.

For explanatory purposes only, FIG. 2 depicts four exemplary configured encoders 162. The configured encoders 162(0)-162(2) are associated with the HEVC encoding standard. The configured encoder 162(0) is the HEVC encoder 164 that implements a "psy-rd" of 0. As persons skilled in the art will recognize, the "psy-rd" parameter for an HEVC encoder typically controls how much the encoder penalizes rate control decisions for the appearance of coding error, and not only by energy. In general, as the value of the psy-rd parameter increases, the number of tuning operations that the HEVC encoder performs to minimize the visual appearance of coding errors also increases. By contrast, the configured encoder 162(1) is the HEVC encoder 164 that implements a "psy-rd" of 1.0. The configured encoder 162(2) is the HM encoder 164 that does not include any parameter mappings 260. Accordingly, the configured encoder 162(2) implements default values for each configuration parameter.

The configured encoder 162(E) is associated with the VP9 encoding standard. As shown, the configured encoder 162(E) is the VP9 encoder 164 that implements a "tune" of "PSNR" and a "speed" of 1. As persons skilled in the art will recognize, the "tune" parameter for a VP9 encoder can typically be set to "PSNR" or "visual." If the tune parameter is PSNR, then the VP9 encoder implements additional tuning operations based on the Peak Signal-To-Noise (PSNR) ratio. By contrast, if the tune parameter is visual, then the VP9 encoder implements additional tuning operations based on visual appearance. As the value of the "speed" parameter increases, the time required for the VP9 encoder to encode media content decreases, but the visual quality of the resulting encoded media content also decreases.

The subsequence-based encoding application 140 may acquire and/or interact with any number and type of the configured encoders 160 in any technically feasible fashion. For instance, in some embodiments, the subsequence-based encoding application 140 generates the configured encoders 162 in the cloud 160 as-needed. More specifically, prior to generating the encoded subsequences using the configured encoder 162(x), the subsequence-based encoding application configures the associated encoder 164 based on the associated configuration 166 to generate the configured encoder 162(x).

Generating Encoded Subsequences Using Different Configured Encoders

FIG. 3 is a more detailed illustration of the subsequence-based encoding application 140 of FIG. 1, according to various embodiments of the present invention. As shown, the subsequence-based encoding application 140 includes, without limitation, an encoding point list 310, subsequence encode sets 320, a convex hull generator 330, convex hulls 340, a trellis iterator 350, a sequence trellis 360, any number of media encode points 370, and a global convex hull 380. The number of the subsequence encode sets 320 equals the number of subsequences 132. Similarly, the number of the convex hulls 340 equals the number of subsequences 132. In general, the subsequence 132(x) is associated with both the subsequence encode set 320(x) and the convex hull 340(x).

Figure 4:
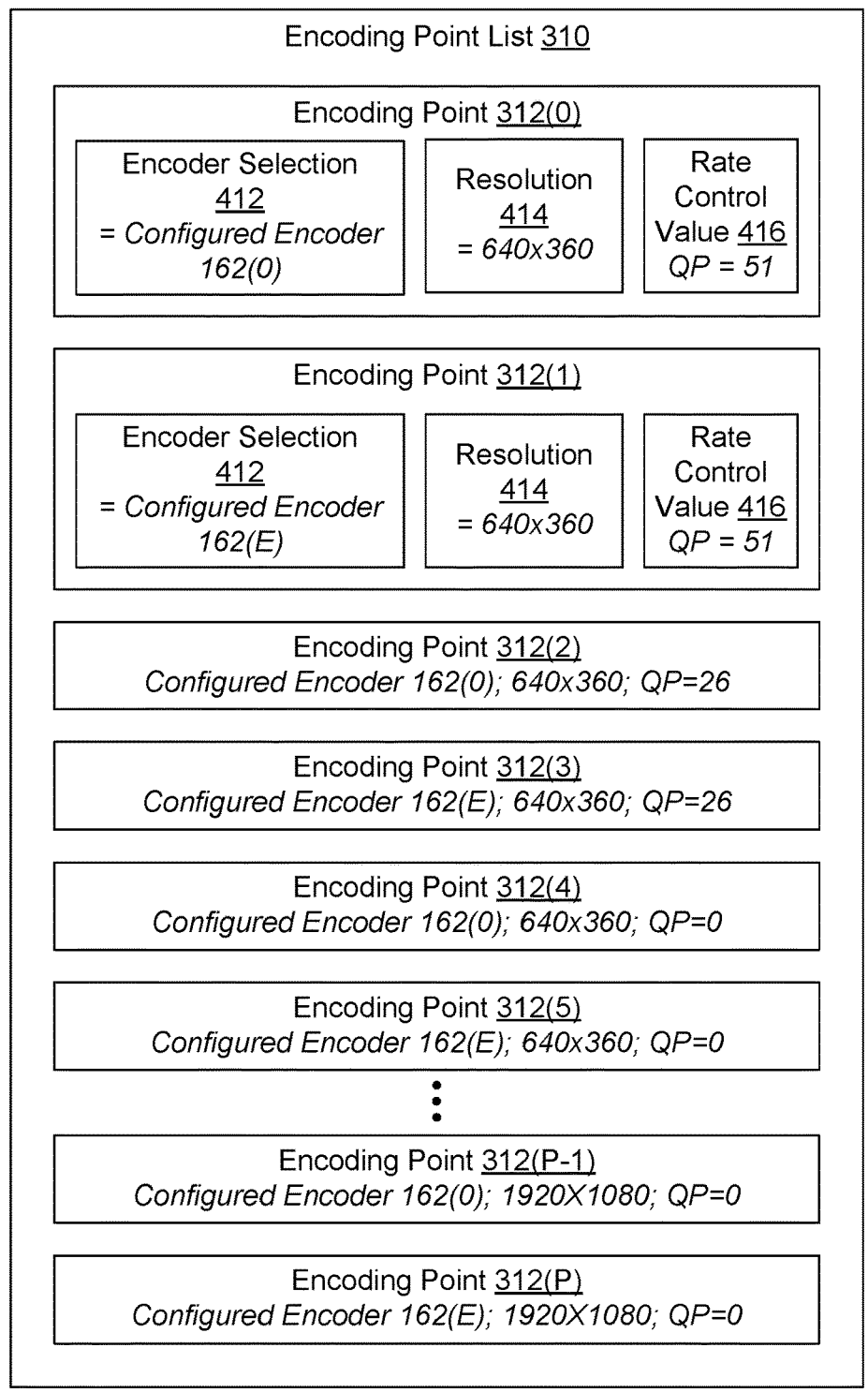
FIG. 4 is a more detailed illustration of the encoding point list of FIG. 3, according to various embodiments of the present invention.

As shown, the encoding point list 310 includes any number of encoding points 312(0)-312(P), As described in greater detail in conjunction with FIG. 4, each of the encoding points 312 includes, without limitation, an encoder selection, a resolution, and a rate control value. The encoder selection specifies one of the configured encoders 162. In operation, the subsequence-based encoding application 140 generates the subsequence encode sets 320(0)-310(S) based on the subsequences 132(0)-132(S) and the encoding point list 310.

Each of the subsequence encode sets 320(0)-320(S) includes, without limitation, subsequence encode points 322(0)-322(P). The number of subsequence encode points 322 included in each of the subsequence encode sets 320 equals the number of the encoding points 312 included in the encoding point list 310. As described in greater detail in conjunction with FIG. 5, each of the subsequence encode points 322(x) includes, without limitation, the associated encoding point 310(x), an encoded subsequence, a bitrate, a quality score, and a distortion level.

For each combination of subsequence 132(x) and encoding point 312(y), the subsequence-based encoding application 140 generates a corresponding subsequence encode point 322(y) and adds the subsequence encode point 322(y) to the subsequence encode set 320(x). More specifically, the subsequence-based encoding application 140 encodes the subsequence 132(x) using the configured encoder 162 associated with the encoding point 312(y) at the resolution and rate control value included in the encoding point 312(y). The subsequence-based encoding application 140 then computes a bitrate of the encoded subsequence, a quality score of the encoded subsequence, and a distortion level of the encoded subsequence. As a result, the subsequence-based encoding application 140 generates (S+1)×(P+1) different subsequence encode points 322.

In alternative embodiments, each of the subsequences 132(x) may be associated with a different encoding point list 310(x) and the number of encoding points in the encoding point list 310(x) may differ from the number of encoding points in any of the other encoding point lists 310. In a complementary fashion, the number of subsequence encode points included in the subsequence encode set 320(x) may differ from the number of subsequence encode points 322 included in any of the other subsequence encode sets 320.

The subsequence-based encoding application 140 may generate each encoded subsequence and determine the associated bitrate, the associated quality score, and the associated distortion level in any technically feasible fashion. For instance, in some embodiments, to generate the encoded subsequence associated with both the subsequence 132(x) and the encoding point 312(y), the subsequence-based encoding application 140 first performs sampling operations to generate a sampled subsequence. More specifically, the subsequence-based encoding application 140 samples the subsequence 132(x) based on the resolution included in the encoding point 312(y) to generate a sampled subsequence. Subsequently, the subsequence-based encoding application 140 causes the configured encoder 162 associated with the encoding point 312(y) to encode the sampled subsequence using the rate control value included in the encoding point 312(y) to generate the encoded subsequence.

In some embodiments, to determine the quality score of the encoded subsequence, the subsequence-based encoding application 140 decodes the encoded subsequence to generate a decoded subsequence. The subsequence-based encoding application 140 then re-samples (i.e., up-samples or down-samples) the decoded subsequence to a target resolution to generate a re-constructed subsequence that is relevant to the display characteristics of a class of endpoint devices.

In alternative embodiments, the subsequence-based encoding application 140 may compute any number of quality scores for any number of resolutions. For example, a certain video may be delivered in 3840×2160 resolution, yet be intended to be consumed by a large number of displays in 1920×1080 resolution. Another class of endpoint devices, for example laptop computers, is expected to display the same video in 1280×720 resolution. Yet another class of endpoint devices, for example, tablet or smartphone devices, is expected to display the same video in 960×540 resolution. The subsequence-based encoding application 140 could up-sample the decoded subsequence to all these target resolutions in order to assess quality, when considering one of these different classes of endpoint devices, correspondingly.

The subsequence-based encoding application 140 then analyzes the re-constructed subsequence to generate the quality score for a quality metric (QM). For instance, in some embodiments the subsequence-based encoding application 140 implements a VMAF (or harmonic VMAF) algorithm to generate a VMAF score for each encoded subsequence based on the associated re-constructed subsequence. Although a multitude of video quality metrics, such as VMAF scores, can be calculated at different target resolutions, it should be clear that, when comparing qualities among encoded subsequences associated with different resolutions, applications need to use the same target resolution for re-sampling, after decoding. For instance, in some embodiments the subsequence-based encoding application 140 re-samples the decoded subsequence to 1920×1080 to generate a re-constructed subsequence. Subsequently, the subsequence-based encoding application 140 computes the quality score for the encoded subsequence based on the associated re-constructed subsequence.

The subsequence-based encoding application 140 may generate the bitrate based on the resolution in any technically feasible fashion. For instance, in some embodiments, the subsequence-based encoding application 140 may divide the total number of bits needed for the resolution by the length of the associated subsequence 132. In the same or other embodiments, the subsequence-based encoding application 140 may compute the distortion level based on the quality score and any technically feasible technique for converting quality to distortion level. For example, the subsequence-based encoding application 140 could invert the quality score to determine the distortion level. In another example, the subsequence-based encoding application 140 could subtract the quality score from a constant value to determine the distortion level.

For each of the subsequences 132(x), the convex hull generator 330 generates a convex hull 340(x) based on the subsequence encode set 320(x). Each of the convex hulls 340(x) includes, without limitation, the subsequence encode points 322 included in the subsequence encode set 320(x) that minimize bitrate for a given distortion level. A detailed example of how the convex hull generator 330 generates the convex hull 340(0) based on the subsequence encode set 320(0) is described in conjunction with FIG. 6.

As described in detail in conjunction with FIGS. 8A-D, the trellis iterator 350 receives the convex hulls 340 and then iteratively updates a sequence trellis 360 to generate any number of media encode points 370. The trellis iterator 350 is a software module, and the sequence trellis 360 is a data structure. As described in greater detail in conjunction with FIG. 7, each of the media encode points 370 includes, without limitation, a subsequence encode list, an encoded media sequence, an overall bitrate, and an overall distortion level. The subsequence encode list includes, without limitation, S+1 subsequence encode points—a different subsequence encode point for each of the subsequences 132. The encoded media sequence includes, without limitation, the S+1 encoded subsequences included in the S+1 subsequence encode points specified in the subsequence encode list. The overall bitrate and the overall distortion level specify, respectively, a bitrate of the encoded media sequence and a distortion level of the encoded media sequence.

As shown, the subsequence-based encoding application 140 generates the global convex hull 380 based on the media encode points 370. In general, for the source media sequence 122, each of the media encode points 270 included in the global convex hull minimizes the overall bitrate for a different overall distortion level. For each of the target metric values 142(t), the subsequence-based encoding application 140 then generates the target media sequence 180(t) based on the global convex hull 380. More precisely, to generate the target media sequence 180(t), the subsequence-based encoding application 140 selects the media encode point that is included in the global convex hull and has a metric value closest to the target metric value 142(t). The subsequence-based encoding application 140 sets the target encoded media sequence 180(t) equal to the encoded media sequence included in the selected media encode point.

FIG. 4 is a more detailed illustration of the encoding point list 310 of FIG. 3, according to various embodiments of the present invention. As shown, the encoding point list 310 includes any number of encoding points 312(0)-312(P). Each of the encoding points 312 includes, without limitation, an encoder selection 412, a resolution 414, and a rate control value 416. The encoder selection specifies one of the configured encoders 162. The rate control value 416 may be a value for any parameter that specifies a tradeoff between bitrate and distortion level or quality during encoding. For instance, in some embodiments, the rate control value 416 is a value for a quantization parameter (QP) that allows a monotonic performance in terms of bitrate and distortion level when encoding video content. The higher the "QP," the lower the resulting bitrate at the expense of lower quality.

For explanatory purposes only, exemplary encoder selections 412, resolutions 414, and rate control values 416 for encoding points 312(0)-312(5), 312(P−1), and 312(P) are depicted in italics. As shown, the encoding point 312(0) includes the encoder selection 412 of the configured encoder 162(0), the resolution 414 of 640×360, and the rate control value 416 QP=51. The encoding point 312(1) includes the encoder selection 412 of the configured encoder 162(E), the resolution 414 of 640×360, and the rate control value 416 QP=51. The encoding point 312(2) includes the encoder selection 412 of the configured encoder 162(0), the resolution 414 of 640×360, and the rate control value 416 QP=26. The encoding point 312(3) includes the encoder selection 412 of the configured encoder 162(E), the resolution 414 of 640×360, and the rate control value 416 QP=26. The encoding point 312(4) includes the encoder selection 412 of the configured encoder 162(0), the resolution 414 of 640×360, and the rate control value 416 QP=0. The encoding point 312(5) includes the encoder selection 412 of the configured encoder 162(E), the resolution 414 of 640×360, and the rate control value 416 QP=0. The encoding point 312(P−1) includes the encoder selection 412 of the configured encoder 162(0), the resolution 414 of 1920×1080, and the rate control value 416 QP=0. The encoding point 312(P) includes the encoder selection 412 of the configured encoder 162(E), the resolution 414 of 1920×1080, and the rate control value 416 QP=0.

As the depicted exemplary encoding points 312 illustrate, any combination of the encoder selection 412, the resolution 414, and the rate control value 416 may differ between any two encoding points 312. Further, any combination of the encoder 164 and the configuration 166 may differ between any two configured encoders 162 specified via any two encoder selections 412.

In general, the subsequence-based encoding application 140 may acquire or generate the encoding list 310 in any technically feasible fashion. For instance, in some embodiments, the subsequence-based encoding application 140 may generate six configured encoders 162 based on permutations of three different encoders 164 and two different configurations 166 for each of the different encoders 164. The subsequence-based encoding application 140 may then generate the encoding list 310 based on permutations of the six configured encoders 162, eight resolutions 414, and all the rate control values 416 allowed by each of the configured encoders 162. Advantageously, because of the wide variety of encoding points 312, the subsequence-based encoding application 140 generates a wide variety of different encoded subsequences for each subsequence 132.

Figure 5:
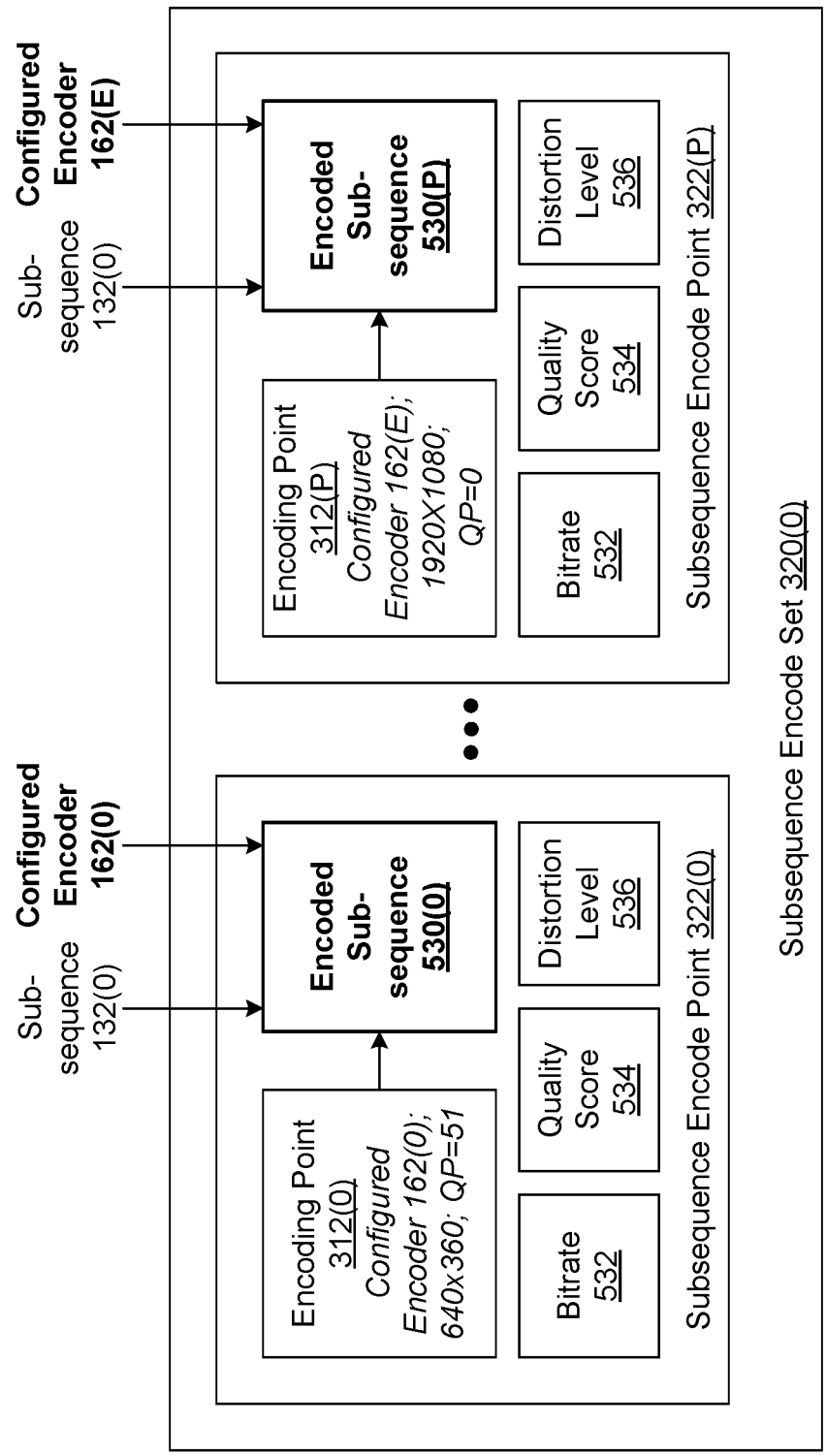
FIG. 5 is a more detailed illustration of one of the subsequence encode sets of FIG. 3, according to various embodiments of the present invention.

FIG. 5 is a more detailed illustration of one of the subsequence encode sets 320 of FIG. 3, according to various embodiments of the present invention. The subsequence encode set 320(0) is associated with the subsequence 132(0). As shown, the subsequence encode set 320(0) includes, without limitation, subsequence encode points 322(0)-322(P). In general, the number of subsequence encode points 322 included in the subsequence encode set 320 is equal to the number of encoding points 312 included in the encoding point list 310. Further, the subsequence encode point 322(x) is associated with the encoding point 312(x).

Each subsequence encode point 312 includes, without limitation, the associated encoding point 312, an encoded subsequence 530, a bitrate 532 of the encoded subsequence 530, a quality score 534 of the encoded subsequence 530, and a distortion level 536 of the encoded subsequence 530. As described previously herein in conjunction with FIG. 3, the subsequence-based encoding application 140 may generate the encoded subsequence 530 in any technically feasible fashion based on the associated encoding point 312 and the associated subsequence 132. Subsequently, the subsequence-based encoding application 140 may determine the bitrate 532, the quality score 534, and the distortion level 536 in any technically feasible fashion based on the encoded subsequence 530. The quality score 534 may be the value for any quality metric.

For explanatory purposes only, exemplary values for the encoding point 312(0) included in the subsequence encode point 312 and the encoding point 312(P) included in the subsequence encode point 312(P) are depicted in italics. The encoding point 312(0) includes, without limitation, the encoder selection 412 of the configured encoder 162(0), the resolution 414 of 640×360, and the rate control value 416 QP=51. Accordingly, the subsequence-based encoding application 140 uses the configured encoder 162(0) to encode the subsequence 132(0) at the resolution 414 of 640×360 and the rate control value 416 QP=51 to generate the encoded subsequence 530(0). By contrast, the encoding point 312(P) includes, without limitation, the encoder selection 412 of the configured encoder 162(E), the resolution 414 of 1920×1080, and the rate control value 416 QP=0. Accordingly, the subsequence-based encoding application 140 uses the configured encoder 162(E) to encode the subsequence 132(0) at the resolution 414 of 1920×1080, and the rate control value 416 QP=0 to generate the encoded subsequence 530(E).

Figure 6:
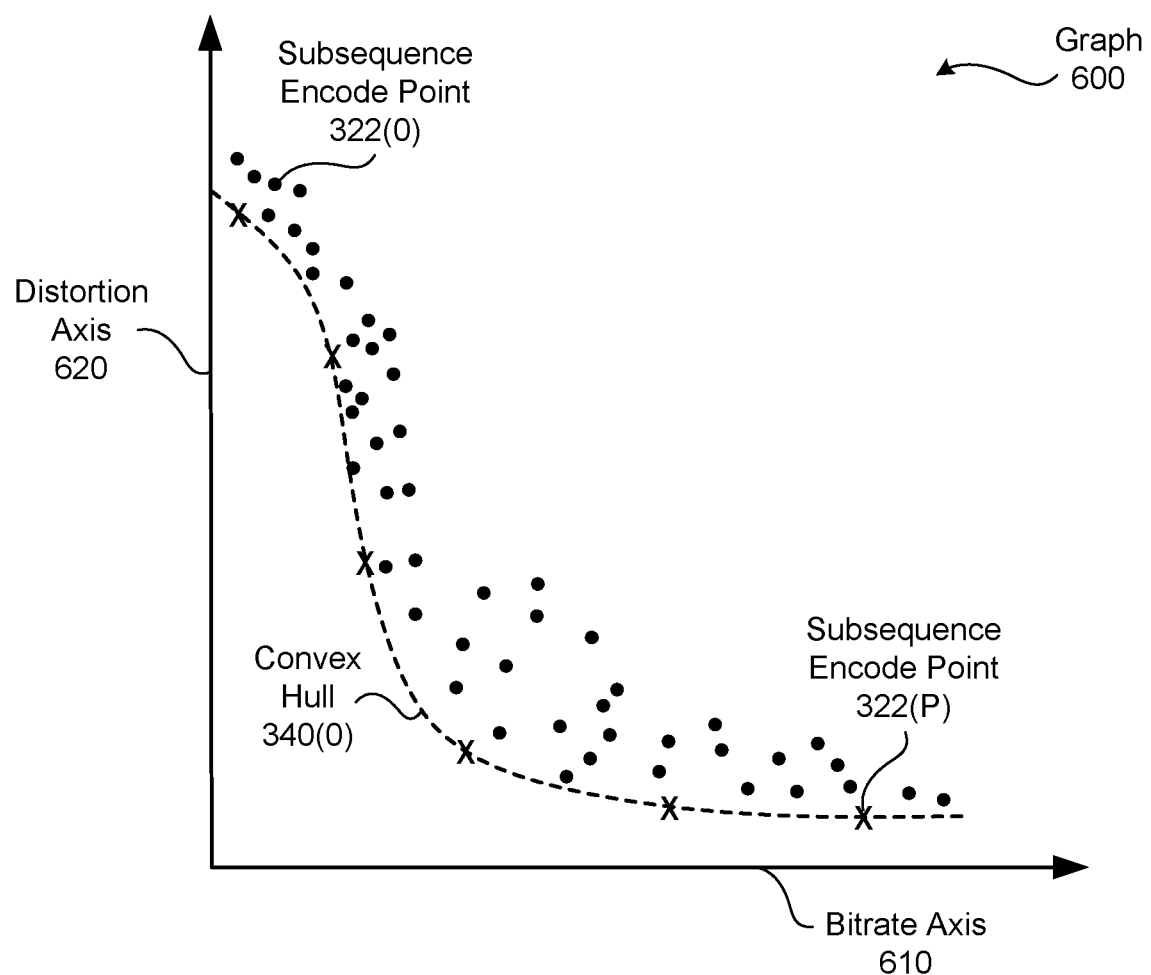
FIG. 6 illustrates an exemplary convex hull that is generated by the convex hull generator of FIG. 3, according to various embodiments of the present invention.

FIG. 6 illustrates an exemplary convex hull 340(0) that is generated by the convex hull generator 330 of FIG. 3, according to various embodiments of the present invention. In particular, the convex hull generator 330 generates the convex hull 340(0) based on the subsequence encode set 320(0). As shown, a graph 600 includes, without limitation, a bitrate axis 610 and a distortion axis 620.

In operation, for each of the subsequence encode points 322 included in the subsequence encode set 320(0) the convex hull generator 330 generates a corresponding plotted subsequence encode point 322 in the graph 600. The convex hull generator 330 plots a given subsequence encode point 322 by locating the bitrate 532 along the bitrate axis 610 and the distortion level 536 along the distortion axis 620. The convex hull generator 330 then evaluates the plotted subsequence encode points 322 to determine the convex hull 340(0).

More specifically, the convex hull generator 330 identifies the plotted subsequence encode points 322 that form a boundary where all the plotted subsequence encode points 322 reside on one side of the boundary (in this case, the right side of the boundary) and also are such that connecting any two consecutive identified plotted subsequence encode points 322 with a straight line leaves all remaining plotted subsequence encode points 322 on the same side. The convex hull 340(0) includes the set of the identified subsequence encode points 322.

For explanatory purposes only, the subsequence encode points 322 that are included the convex hull 340(0) are depicted as crosses in the graph 600, while the remaining subsequence encode points 322 are depicted as filled circles in the graph 600. In particular, the subsequence encode point 322(P) is included in the convex hull 340(0), while the subsequence encode point 322(0) is not included in the convex hull 340(0).

Persons skilled in the art will understand that many techniques for generating convex hulls are well known in the field of mathematics, and all such techniques may be implemented to generate the convex hulls 340. In one embodiment, the convex hull generator 330 applies machine-learning techniques to estimate the subsequence encode points 322 included in the convex hull 340 based on various parameters of the associated subsequence 132 and/or source media sequence 122. In this manner, some of the computations discussed thus far may be streamlined and/or avoided entirely.

Combining Different Encoded Subsequences

Figure 7:
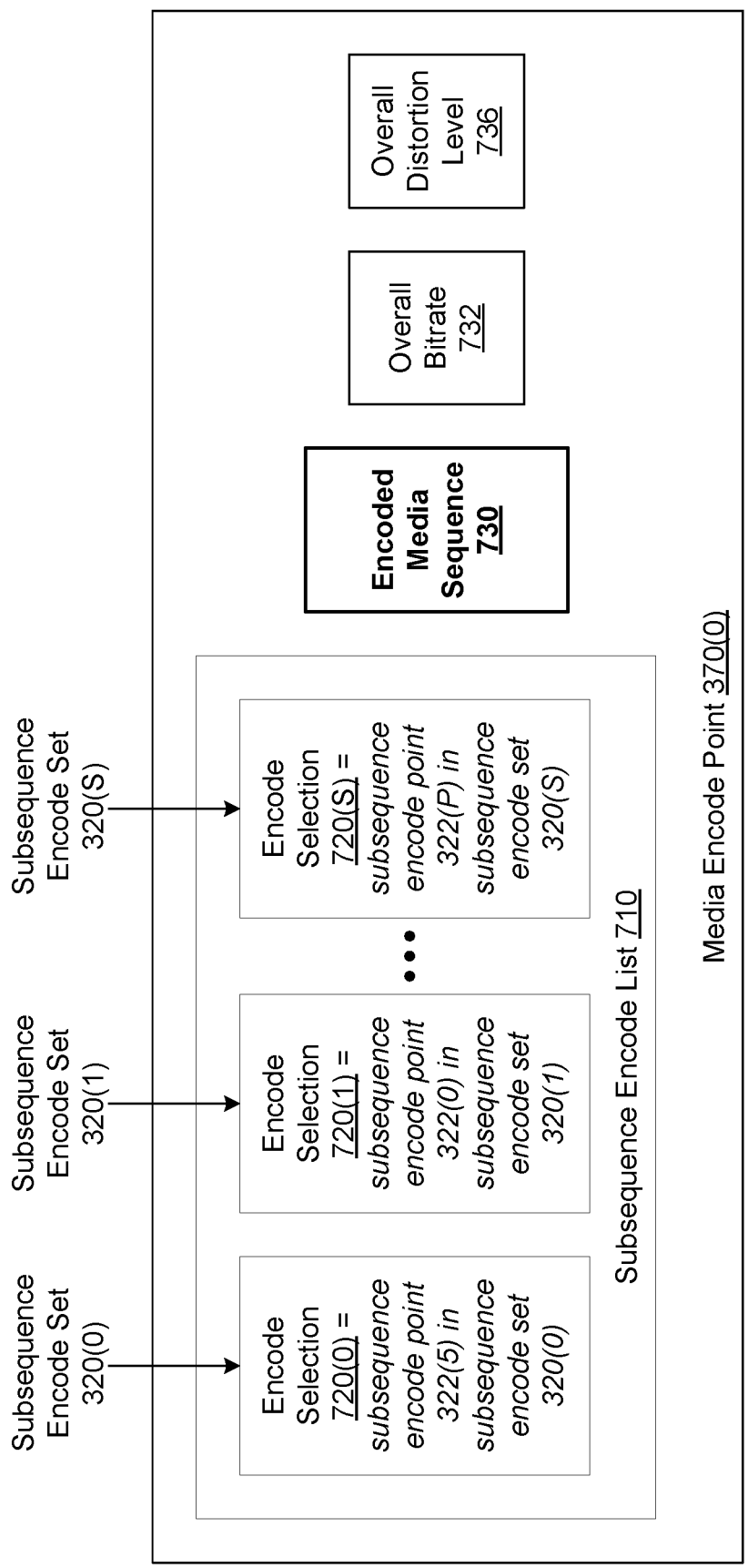
FIG. 7 is a more detailed illustration of one of the media encode points of FIG. 3, according to various embodiments of the present invention.

FIG. 7 is a more detailed illustration of one of the media encode points 370 of FIG. 3, according to various embodiments of the present invention. As shown, the media encode point 370(0) includes, without limitation, a subsequence encode list 710, an encoded media sequence 730, an overall bitrate 732, and an overall distortion level 736. As described in greater detail in conjunction with FIGS. 8A-8D, the trellis iterator 350 generates the media encode point 370(0) based on the convex hulls 340.

The subsequence encode list 710 includes, without limitation, encode selections 720(0)-720(S). The number of encode selections 720 is equal to the number of subsequences 132. More specifically, the subsequence encode list 710 includes a different encode selection 720(x) for each subsequence 132(x). Each of the encode selections 720 specifies a different subsequence encode point 322. In general, the encode selection 720(x) specifies one of the subsequence encode points 322 included in the subsequence encode set 320(x) associated with the subsequence 132(x).

For explanatory purposes only, exemplary values for the encode selections 720(0), 720(1), and 720(S) are depicted in italics. The encode selection 720(0) specifies the subsequence encode point 322(5) in the subsequence encode set 320(0). The encode selection 720(1) specifies the subsequence encode point 322(0) in the subsequence encode set 320(1). The encode selection 720(S) specifies the subsequence encode point 322(P) in the subsequence encode set 320(S).

The encoded media sequence 730 includes, without limitation, the S+1 encoded subsequences 530 included in the S+1 subsequence encode points 322 specified in the subsequence encode list 710. The overall bitrate 732 and the overall distortion level 736 specify, respectively, a bitrate of the encoded media sequence 730 and a distortion level 736 of the encoded media sequence. The trellis iterator 350 and/or the subsequence-based encoding application 140 may determine the encoded media sequence 730, the overall bitrate 732, and the overall distortion level 736 in any technically feasible fashion.

FIGS. 8A-8D are more detailed illustrations showing how the trellis iterator 350 of FIG. 3 generates media encode points 370 based on subsequence encode points 322, according to various embodiments of the present invention. As shown, the sequence trellis 360 includes, without limitation, a subsequence axis 810 and the bitrate axis 610. The sequence trellis 360 also includes, without limitation, columns of the subsequence encode points 322 included in the convex hulls 340, where each column corresponds to a particular subsequence 132.

For example, the zeroth column included in the sequence trellis 360 corresponds to the subsequence encode points 322 included in the convex hull 340(0). The subsequence encode points 322 included in any column are ranked according to ascending bitrate 532 (and, by construction, descending distortion levels 536). The "hull" subsequence encode points 322 included in any column are also guaranteed to have negative slopes that—in magnitude—are decreasing as a function of the bitrate 532.

For convenience, the hull subsequence encode points 322 are individually indexed according to the following system. For a given hull subsequence encode point 322, the first number is an index of the subsequence 132, and the second number is an index into the bitrate ranking of those hull subsequence encode points 322. For example, the hull subsequence encode point 322 00 corresponds to the zeroth subsequence 132(0) and the zeroth ranked bitrate 532. Similarly, the hull subsequence encode point 322 43 corresponds to the fourth subsequence 132(4) and the third-ranked bitrate 532 (in this case the highest ranked bitrate 532).

As previously described in conjunction with FIG. 6, each hull subsequence encode point 322 included within the sequence trellis 360 includes a different encoded subsequence 530. The trellis iterator 350 generates the encoded media sequences 730 by combining the hull subsequence encode points 322 based on properties of the associated encoded subsequences 530. The trellis iterator 350 implements the sequence trellis 360 to iteratively perform this combining technique.

In alternative embodiments, the trellis iterator 350 may combine the hull subsequence encode points 322 based on any associated properties (e.g., the bitrates 532, the quality scores 534, and/or the distortion levels 536) of the encoded subsequences 530 without the encoded subsequences 530 themselves. In the same or other embodiments, the trellis iterator 250 may combine the hull subsequence encode points 322 to generate the subsequence encode list 710 without generating the encoded media sequences 730 themselves. In this fashion, the subsequence encode list 710 is an "encoding recipe" that specifies how the encoded media subsequence 730 is generated.

Figure 8A:
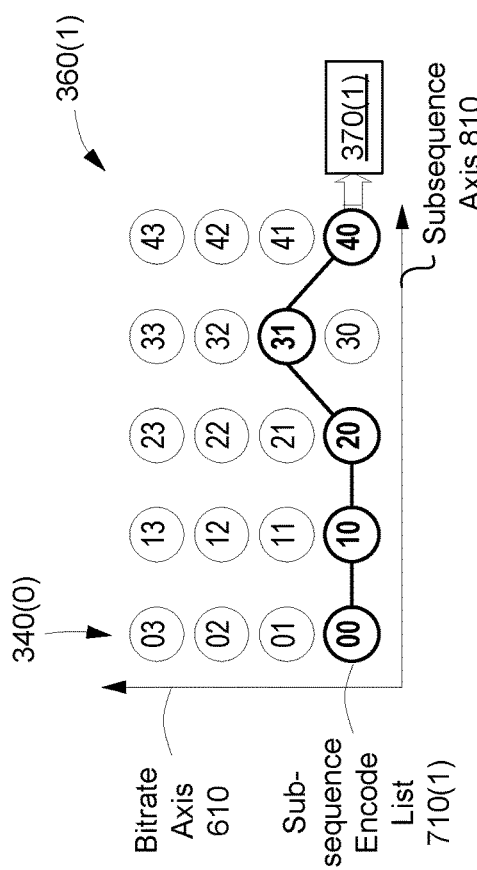
FIGS. 8A-8D are more detailed illustrations showing how the trellis iterator of FIG. 3 generates media encode points based on subsequence encode points, according to various embodiments of the present invention.
Figure 8B:
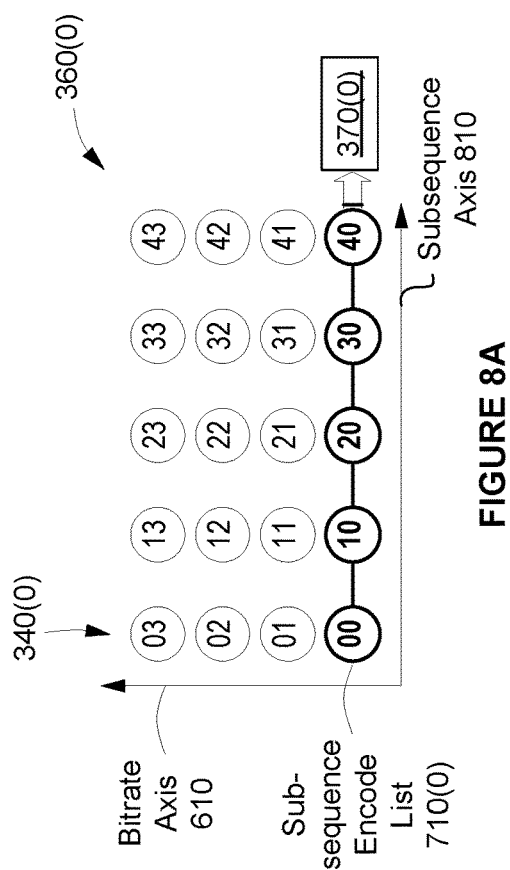

Each of FIGS. 8A-8D illustrates a different version of the sequence trellis 360 generated by the trellis iterator 350 at a different iteration. FIG. 8A illustrates the sequence trellis 360(0) in an initial state. Here, the trellis iterator 350 generates the subsequence encode list 710(0) that includes the hull subsequence encode points 322 00, 10, 20, 30, and 40. These initially selected hull subsequence encode points 322 have the lowest bitrate 532 and highest distortion levels 536, and therefore reside at the bottom of the respective columns.

The trellis iterator 350 generates the encoded media sequence 730(0) based on the subsequence encode list 710(0). More precisely, the trellis iterator 350 aggregates the encoded subsequences 530 included in, sequentially, the hull subsequence encode points 322 00, 10, 20, 30, and 40 to generate the encoded media sequence 730(0). Subsequently, the trellis iterator 350 computes the overall bitrate 732(0) and the overall distortion level 736(0) of the encoded media sequence 730(0). The trellis iterator 350 may compute the overall bitrate 732(0) and the overall distortion level 736(0) in any technically feasible fashion. The trellis iterator 350 then generates the media encode point 370(0) that includes, without limitation, the subsequence encode list 710(0), the encoded media sequence 730(0), the overall bitrate 732(0), and the overall distortion level 736(0).

The trellis iterator 350 then computes, for each hull subsequence encode point 322 within the subsequence encode list 710(0), the rate of change of distortion level 536 with respect to bitrate 532 between the hull subsequence encode point 322 and the above-neighbor of the hull subsequence encode point 322. For example, the trellis iterator 350 could compute the rate of change of distortion 536 level with respect to bitrate 532 between nodes 00 and 01, 10 and 11, 20 and 21, 30 and 31, and 40 and 41. Notably, the computed rate of change for the hull subsequence encode point 322 that includes a particular encoded subsequence 530 represents the derivative of a distortion curve (not shown) associated with that subsequence 132, taken at the hull subsequence encode point 322.

The trellis iterator 350 selects the derivative having the greatest magnitude, and then selects the above neighbor associated with that derivative for specification in a subsequent subsequence encode list 710. For example, in FIG. 8B, the trellis iterator 350 determines that the derivative associated with hull subsequence encode point 322 30 is greatest, and therefore includes hull subsequence encode point 322 31 (the above-neighbor of hull subsequence encode point 322 30) in the subsequence encode list 710(1). In particular, as shown, the trellis iterator 350 generates the subsequence encode list 710(1) that specifies the hull subsequence encode points 322 00, 10, 20, 31, and 40.

The trellis iterator 350 generates the encoded media sequence 730(1) based on the subsequence encode list 710(1). More precisely, the trellis iterator 350 aggregates the encoded subsequences 530 included in, sequentially, the hull subsequence encode points 322 00, 10, 20, 31, and 40 to generate the encoded media sequence 730(1). Subsequently, the trellis iterator 350 computes the overall bitrate 732(1) and the overall distortion level 736(1) of the encoded media sequence 730(1). The trellis iterator 350 then generates the media encode point 370(1) that includes, without limitation, the subsequence encode list 710(1), the encoded media sequence 730(1), the overall bitrate 732(1), and the overall distortion level 736(1).

Figure 8C:
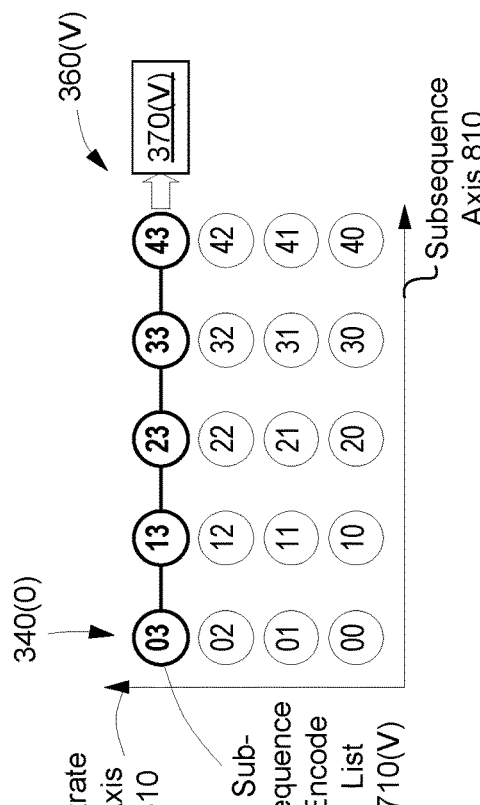

The trellis iterator 350 performs this technique iteratively, thereby ascending the sequence trellis 360, as shown in FIGS. 5C-5D. In FIG. 8C, the trellis iterator 350 determines that the derivative associated with the hull subsequence encode point 322 00 is greatest compared to other derivatives, and therefore selects the hull subsequence encode point 322 01 for specification in the subsequence encode list 710(2). As shown, the trellis iterator 350 generates the subsequence encode list 710(2) that specifies the hull subsequence encode points 322 01, 10, 20, 31, and 40.

The trellis iterator 350 then generates the encoded media sequence 730(2) based on the subsequence encode list 710(2). More precisely, the trellis iterator 350 aggregates the encoded subsequences 530 included in, sequentially, the hull subsequence encode points 322 01, 10, 20, 31, and 40 to generate the encoded media sequence 730(2). Subsequently, the trellis iterator 350 computes the overall bitrate 732(2) and the overall distortion level 736(2) of the encoded media sequence 730(2). The trellis iterator 350 then generates the media encode point 370(2) that includes, without limitation, the subsequence encode list 710(2), the encoded media sequence 730(2), the overall bitrate 732(2), and the overall distortion level 736(2).

Figure 8D:
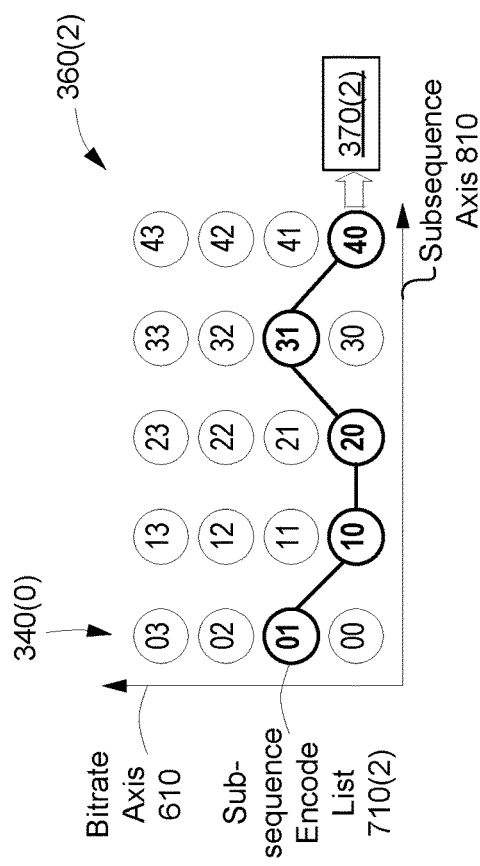

The trellis iterator 350 continues this process until, as shown in FIG. 8D, generating the media encode point 370(V). The media encode point 370(V) includes, without limitation, the subsequence encode list 710(V), the encoded media sequence 730(3), the overall bitrate 732(V), and the overall distortion level 736(V).

In this manner, the trellis iterator 350 incrementally improves the trellis encode list 710 by selecting a single hull subsequence encode point 322 for which the overall bitrate 732 is increased and the overall distortion level 736 is decreased, thereby generating a collection of encoded media sequences 730 associated with increasing overall bitrate 732 and decreasing overall distortion level 736.

In one embodiment, the trellis iterator 350 adds hull subsequence encode points 322 prior to ascending the sequence trellis 360 in order to create a terminating condition. In doing so, the trellis iterator 350 may duplicate hull subsequence encode points 322 having the greatest bitrate 532 to cause the rate of change between the second to last and the last hull subsequence encode points 322 to be zero. When this zero rate of change is detected for all the subsequences 132, i.e., when the maximum magnitude of rate of change is exactly zero, the trellis iterator 350 identifies the terminating condition and stops iterating.

Figure 9:
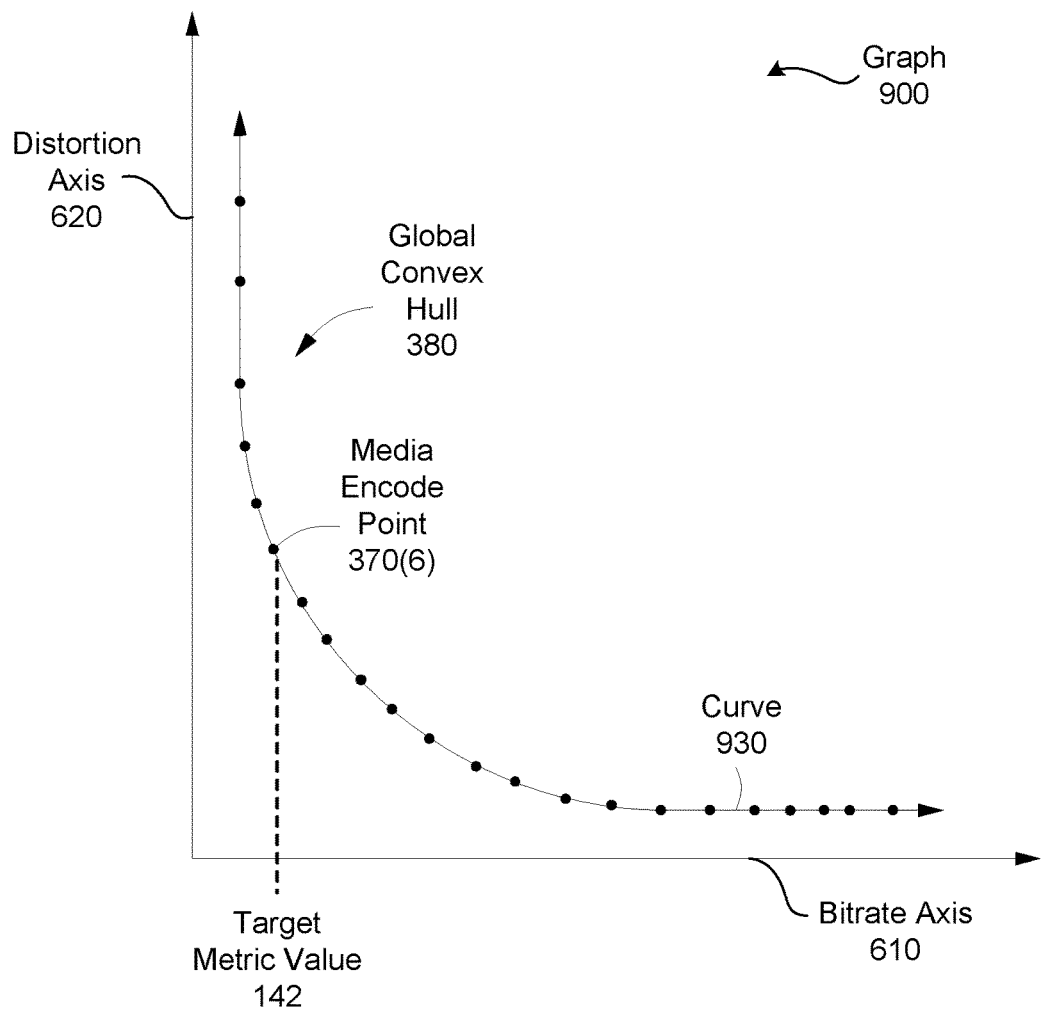
FIG. 9 illustrates an exemplary global convex hull and an exemplary target encoded media sequence that are generated by the subsequence-based encoding application of FIG. 3, according to various embodiments of the present invention.

FIG. 9 illustrates an exemplary global convex hull 380 and an exemplary target encoded media sequence 180 that are generated by the subsequence-based encoding application 140 of FIG. 3, according to various embodiments of the present invention. More specifically, the subsequence-based encoding application 180 generates the global convex hull 380 shown in FIG. 9 using the media encode points 370 shown in FIGS. 8A-8D. As shown, a graph 900 includes, without limitation, the bitrate axis 610 and the distortion axis 620.

As described in detail in conjunction with FIGS. 8A-8D, the trellis iterator 350 generates the encoded media sequences 730 in an ascending manner to reduce the overall distortion level 736 and increase the overall bitrate 732. Consequently, the encoded media sequences 730 span a range from high overall distortion level 736 and low overall bitrate 732 to low overall distortion level 736 and high overall bitrate 732. Among other things, each of the media encode points 370(x) includes the overall bitrate 732 associated with the encoded media sequences 730(x) and the overall distortion level 736 associated with the encoded media sequence 730(x).

As shown, the subsequence-based encoding application 140 plots the different media encode points 370 against the bitrate axis 610 and the distortion axis 620 to generate the global convex hull 380. The subsequence-based encoding application 140 then connects the points (i.e., the media encode points 370) included in the global convex hull 380 to generate a curve 930. Accordingly, the curve 930 represents the overall distortion level 736 as a function of the overall bitrate 732 across all the encoded media sequences 730. In alternative embodiments, the subsequence-based encoding application 140 may generate the global convex hull 380 and the curve 930 in any technically feasible fashion.

In general, based on the curve 930, the subsequence-based encoding application 140 can select, for a given overall bitrate 732, the media encode point 370 that includes the encoded media sequence 730 that minimizes the overall distortion level 736. Conversely, the subsequence-based encoding application 140 can select, for a given overall distortion level 736, the media encode point 370 that includes the encoded media sequences 730 that minimizes the overall bitrate 732.

For each of the target metric values 142(0)-142(N), the subsequence-based encoding application 140 selects a different "optimized" media encode point 370. More precisely, for the target metric value 142(x), the subsequence-based encoding application 140 selects the optimized media encode point 380 having a metric value that lies closest to the target metric value 142(x). The subsequence-based encoding application 140 then sets the associated target media sequence 180(x) equal to the encoded media sequence 730 included in the optimized media encode point 370.

Each target metric value 142 may be any value for any type of media metric. For example, a given target metric value 142 could be a target overall bitrate 732, a target overall quality score, or a target overall distortion level 736, to name a few. In the embodiment depicted in FIG. 9, the target metric value 142 is a target overall bitrate 732. Accordingly, the subsequence-based encoding application 140 selects the optimized media encode point 370(6) that includes the encoded media sequence 730(6) having the overall bitrate 732(6) that lies closest to the target metric value 142. The subsequence-based encoding application 140 then sets the target encoded media sequence 180 equal to the encoded media sequence 730(6).

As shown, the target encoded media sequence 180 includes, without limitation, a 960×540 version of the subsequence 132(0) encoded using an HEVC encoder with psy-rd=0 at QP=40, followed by a 640×360 version of the subsequence 132(1) encoded using a VP9 encoder with tune=PSNR and speed=1 at QP=11, followed by a 1280×720 version of the subsequence 132(2) encoded using the HEVC encoder with psy-rd=0 at QP=47, followed by a 960×540 version of the subsequence 132(3) encoded using the HEVC encoder with psy-rd=1.0 at QP=26, and ending with a 640×360 version of the subsequence 132(4) encoded using the HEVC encoder with psy-rd=0 at QP=2. Advantageously, as illustrated in FIG. 8, each of the encoder 164, the configuration 166, the resolution 414, and the rate control value 416 may vary across the subsequences 132 included in each target encoded media sequence 180.

Figure 10A:
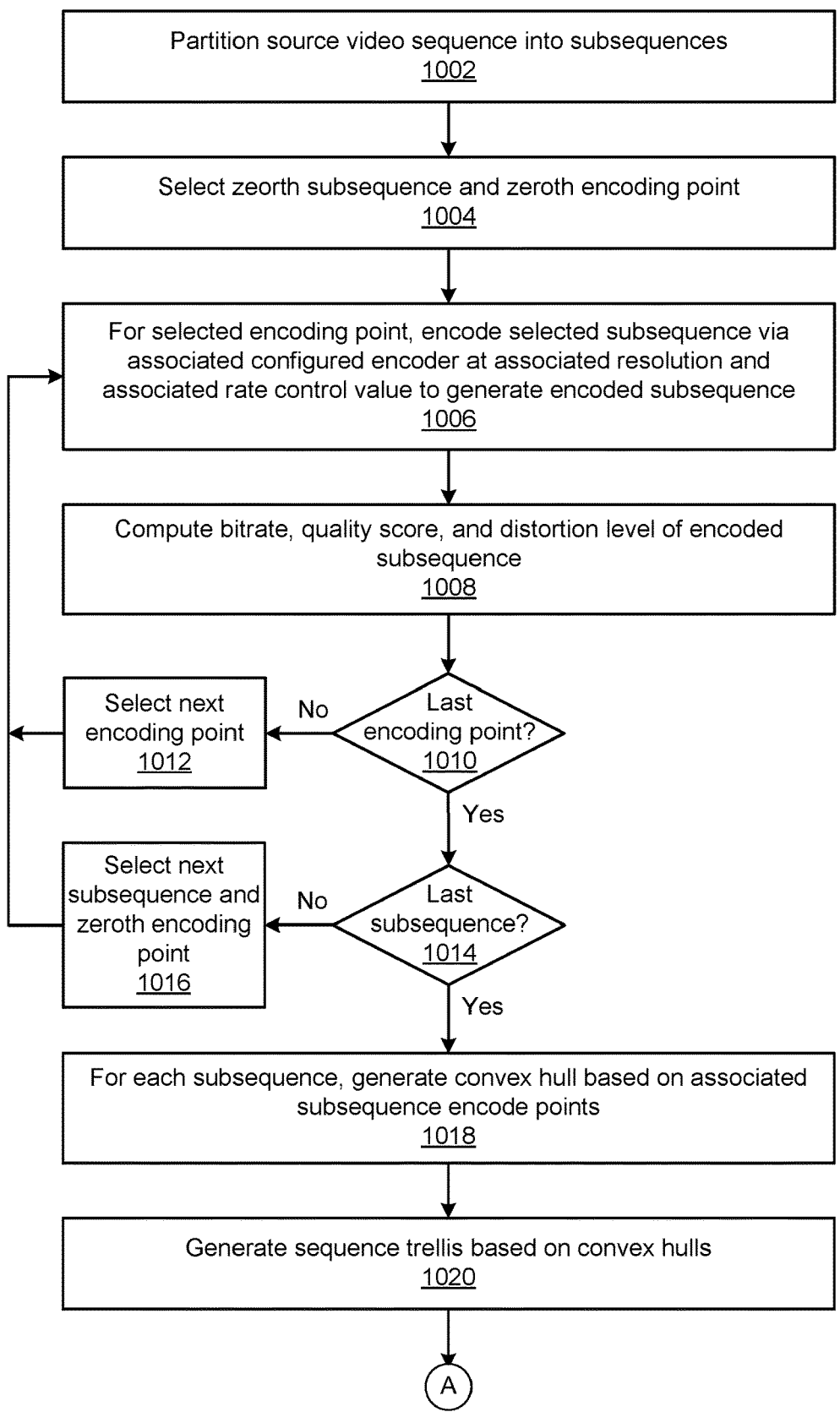
FIGS. 10A-10B set forth a flow diagram of method steps for encoding a source media sequence, according to various embodiments of the present invention.
Figure 10B:
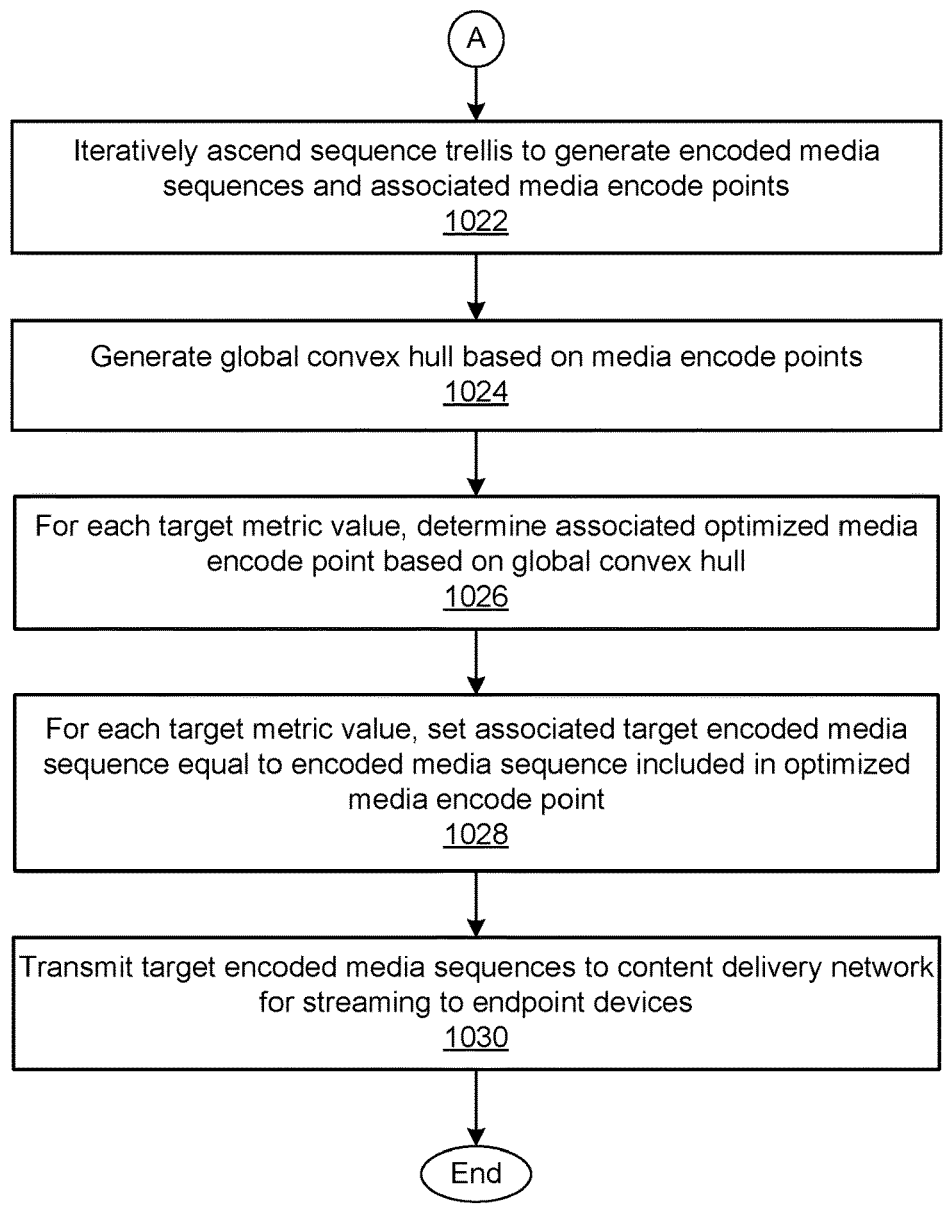

FIGS. 10A-10B set forth a flow diagram of method steps for encoding a source media sequence, according to various embodiments of the present invention. Although the method steps are described with reference to the systems of FIGS. 1-9, persons skilled in the art will understand that any system configured to implement the method steps, in any order, falls within the scope of the present invention.

As shown, a method 1000 begins a step 1002, where the subsequence analyzer 130 partitions the source media sequence 122 into the subsequences 132. At step 1004, the subsequence-based encoding application 140 selects the zeroth subsequence 132(0) and the zeroth encoding point 312(0) included in the encoding point list 310. In alternative embodiments, each subsequence 132(x) may be associated with a different encoding point list 310(x).

At step 1006, for the selected encoding point 312, the subsequence-based encoding application 140 encodes the selected subsequence 132 via the associated configured encoder 162 at the associated resolution 414 and the associated rate control value 416 to generate the associated encoded subsequence 530. At step 1008, the subsequence-based encoding application 140 computes the bitrate 532, the quality score 534, and the distortion level 536 based on the encoded subsequence 530. As part of step 1008, the subsequence-based encoding application 140 generates a new subsequence encode point 322 that includes, without limitation, the encoding point 312, the encoded subsequence 530, the bitrate 532, the quality score 534, and the distortion level 536.

At step 1010, the subsequence-based encoding application 140 determines whether the selected encoding point 312 is the last encoding point 312 included in the encoding point list 310. If, at step 1010, the subsequence-based encoding application 140 determines that the selected encoding point 312 is not the last encoding point 312 included in the encoding point list 310, then the method 1000 proceeds to step 1012. At step 1012, the subsequence-based encoding application 140 selects the next encoding point 312 included in the encoding point list 310. The method 1000 then returns to step 1006, where the subsequence-based encoding application 140 generates a new subsequence encode point 322.

If, however, at step 1010, the subsequence-based encoding application 140 determines that the selected encoding point 312 is the last encoding point 312 included in the encoding point list 310, then the method 1000 proceeds directly to step 1014. At step 1014, the subsequence-based encoding application 140 determines whether the selected subsequence 132 is the last subsequence 132. If, at step 1014, the subsequence-based encoding application 140 determines that the selected subsequence 132 is not the last subsequence 132, then the method 1000 proceeds to step 1016. At step 1016, the subsequence-based encoding application 140 selects the next subsequence 132 and the zeroth encoding point 312(0). The method 1000 then returns to step 1006, where the subsequence-based encoding application 140 generates a new subsequence encode point 322.

If, however, at step 1014, the subsequence-based encoding application 140 determines that the selected subsequence 132 is the last subsequence 132, then the method 1000 proceeds directly to step 1018. At step 1018, for each subsequence 132(x), the convex hull generator 330 generates a different convex hull 340(x) based on the associated subsequence encode points 322. Notably, the encoders 164, the configurations 166, the resolutions 414, and rate control values 416 may vary between the subsequence encode points 322 included in the convex hull 340(x). At step 1020, the trellis iterator 350 generates the sequence trellis 360 based on the convex hulls 340. At step 1022, the trellis iterator 350 iteratively ascends the sequence trellis 360 to generate the encoded media sequences 730 and the associated media encode points 370. At step 1024, the trellis iterator 350 generates the global convex hull 380 based on the media encode points 370.

At step 1026, for each target metric value 142(y), the subsequence-based encoding application 140 determines a different optimized media encode point 370 based on the global convex hull 380. At step 1028, for each target metric value 142(y), the subsequence-based encoding application 140 sets the target encoded media sequence 180(y) equal to encoded media sequence 730 included in the associated optimized media encode point 370. At step 1030, the subsequence-based encoding application 140 transmits the target encoded media sequences 180 to the content delivery network 190 for streaming to endpoint devices. The method 1000 then terminates.

In sum, the disclosed techniques enable efficient and optimal encoding of source media sequences for streaming to endpoint devices. A subsequence-based encoding subsystem includes, without limitation, a subsequence analyzer and a subsequence-based encoding application. Initially, the subsequence analyzer partitions a source media sequence into multiple subsequences. For each subsequence, the subsequence-based encoding subsystem generates multiple encoded subsequences based on an encoding list. The encoding list includes, without limitation, any number of encoding points, where each encoding point specifies a different combination of a configured encoder, a resolution, and a rate control value.

Each configured encoder is associated with a different combination of a encoder and a set of configuration parameter values that customize the encoding operations performed by the configured encoder. Accordingly, two different configured encoders typically perform different encoding operations when encoding a given subsequence at a given resolution and a given rate control value and, consequently, generate different encoded subsequences.

For each encoded subsequences, the subsequence-based encoding application generates a different subsequence encode point. Each subsequence encode point includes, without limitation, the associated encoded subsequence, the associated encoding point, a bitrate of the encoded subsequence, a quality score of the encoded subsequence, and a distortion level of the encoded subsequence. Subsequently, for each subsequence, a convex hull generator generates a convex hull that includes a subset of the subsequence encode points associated with the subsequence. In general, for a given subsequence, the subsequence encode points included in the associated convex hull minimize the bitrate for different distortion levels.

A trellis iterator then evaluates the convex hulls across all of the subsequences to determine subsequence encode lists. Each subsequence encode list specifies subsequence encode points for the different subsequences. For each subsequence encode list, the trellis iterator aggregates the different encoded subsequences included in the subsequence encode points to generate an encoded media sequence. For each encoded media sequence, the trellis iterator then generates a media encode point. Each media encode point includes, without limitation, the encoded media sequence, the associated subsequence encode list, an overall bitrate of the encoded media sequence, and an overall distortion level of the encoded media sequence. Subsequently, the subsequence-based encoding application generates a global convex hull based on the media encode points. In general, for the source media sequence, the media encode points included in the global convex hull minimize the overall bitrate for different overall distortion levels.

For each target metric value, the subsequence-based encoding application sets an associated target encoded media sequence equal to the encoded media sequence included in the global convex hull that has a metric value closest to the target metric value. Finally, the subsequence-based encoding application transmits the target encoded media sequences to a content delivery network for distribution to endpoint devices.

At least one advantage and technological advancement of the disclosed techniques is that aggregating subsequences encoded using different encoders to generate the encoded media sequences reduces the encoding inefficiencies typically associated with prior art encoding techniques. In particular, the disclosed techniques individually optimize the configured encoder, the resolution, and the rate control value used to encode each subsequence within a target encoded media sequence with respect to both the target metric and the subsequence. For example, a target encoded media sequence could include a car chase shot that is encoded using an HEVC encoder, a resolution of 1280×720, and a QP value of 1 followed by a monologue shot that is encoded using a VP9 encoder, a resolution of 960×540, and a QP value of 50. By reducing encoding inefficiencies, the disclosed techniques not only reduce computational and storage resources, but also reduce the bandwidth required to stream encoded versions of media titles to endpoint devices. These technical advantages provide one or more technological advancements over the prior art.

1. In some embodiments, a computer implemented method comprises generating a plurality of subsequences based on a source sequence associated with a media title; encoding a first subsequence included in the plurality of subsequences across each configured encoder included in a plurality of configured encoders and at least one rate control value to generate a first plurality of encoded subsequences, wherein each configured encoder included in the plurality of configured encoders is associated with a combination of an encoder and a configuration, and at least two configured encoders included in the plurality of configured encoders are different from one another; encoding a second subsequence included in the plurality of subsequences across each configured encoder in the plurality of configured encoders and the at least one rate control value to generate a second plurality of encoded subsequences; generating a plurality of encoded media sequences based on the first plurality of encoded subsequences and the second plurality of encoded subsequences; and selecting a first encoded media sequence from the plurality of encoded media sequences based on a first target value for a media metric to subsequently stream to a first endpoint device during playback of the media title.

2. The computer-implemented method of clause 1, wherein a first configured encoder included in the plurality of configured encoders is associated with a first encoder, and a second configured encoder included in the plurality of configured encoders is associated with a second encoder that differs from the first encoder.

3. The computer-implemented method of clauses 1 or 2, wherein a first configured encoder included in the plurality of configured encoders is associated with a first encoding standard, a second configured encoder included in the plurality of configured encoders is associated with a second encoding standard that differs from the first encoding standard, and further comprising indicating to the first endpoint device that the first encoded media sequence is associated with multiple encoding standards.

4. The computer-implemented method of any of clauses 1-3, wherein a first configured encoder included in the plurality of configured encoders is associated with a first encoder and a first value for a configuration parameter, and a second configured encoder included in the plurality of configured encoders is associated with the first encoder and a second value for the configuration parameter.

5. The computer implemented method of any of clauses 1-4, wherein a first configured encoder included in the plurality of configured encoders is associated with a first configuration that specifies at least one of a profile level, an analysis level, a search level, a psycho-visual option, a performance option, or a tuning option.

6. The computer-implemented method of any of clauses 1-5, wherein generating the plurality of encoded media sequences comprises generating a first convex hull based on the first plurality of encoded subsequences; generating a second convex hull based on the second plurality of encoded subsequences; and performing one or more optimization operations based on the first convex hull and the second convex hull to generate the plurality of encoded media sequences.

7. The computer-implemented method of any of clauses 1-6, wherein, when encoding the first subsequence, a first configured encoder included in the plurality of configured encoders, for each rate control value included in the at least one rate control value, encodes the first subsequence based on the rate control value to generate a different encoded subsequence included in the first plurality of encoded subsequences.

8. The computer-implemented method of any of clauses 1-7, wherein encoding the first subsequence comprises, for each resolution included in a plurality of resolutions, sampling the first subsequence to generate a different sampled subsequence; and for each different sampled subsequence, encoding the sampled subsequence across each configured encoder included in the plurality of configured encoders and at the at least one rate control value to generate a different plurality of encoded subsequences included in the first plurality of encoded subsequences.

9. The computer-implemented method of any of clauses 1-8, further comprising selecting a second encoded media sequence from the plurality of encoded media sequences based on a second target value for the media metric to subsequently stream to a second endpoint device during playback of the media title.

10. The computer-implemented method of any of clauses 1-9, wherein the media metric comprises a bitrate, a distortion metric, a peak signal-to-noise-ratio (PSNR), a linear media multimethod assessment fusion (VMAF) metric, a harmonic VMAF (VMAFh) metric, or an audio quality metric.

11. In some embodiments, one or more non-transitory computer readable media include instructions that, when executed by one or more processors, cause the one or more processors to perform the steps of partitioning a source subsequence associated with a media title into a plurality of subsequences; generating a first encoded subsequence that is associated with both a first subsequence included in the plurality of subsequences and a first encoder; generating a second encoded subsequence that is associated with both a second subsequence included in the plurality of subsequences and a second encoder; and generating a first encoded media sequence based on the first encoded subsequence and the second encoded subsequence, wherein at least a portion of the first encoded media sequence is subsequently streamed to a first endpoint device during playback of the media title.

12. The one or more non-transitory computer readable media of clause 11, wherein the first encoder is associated with a first encoding standard, the second encoder is associated with a second encoding standard that differs from the first encoding standard, and further comprising indicating to the first endpoint device that the first encoded media sequence is associated with multiple encoding standards.

13. The one or more non-transitory computer readable media of clauses 11 or 12, wherein the first encoder is associated with a first configuration that specifies at least one of a profile level, an analysis level, a search level, a psycho-visual option, a performance option, or a tuning option.

14. The one or more non-transitory computer readable media of any of clauses 11-13, wherein generating the first encoded subsequence comprises encoding the first subsequence across each encoder included in a plurality of encoders that includes the first encoder to generate a first plurality of encoded subsequences that includes the first encoded subsequence.

15. The one or more non-transitory computer readable media of any of clauses 11-14, wherein generating the first encoded media sequence comprises generating a first convex hull based on a first plurality of encoded subsequences that includes the first encoded subsequence; generating a second convex hull based on a second plurality of encoded subsequences that includes the second encoded subsequence; and performing one or more optimization operations based on the first convex hull and the second convex hull to generate the first encoded media sequence.

16. The one or more non-transitory computer readable media of any of clauses 11-15, wherein, the first encoded subsequence is associated with a first resolution and a first rate control value, and the second encoded subsequence is associated with a second resolution that differs from the first resolution and a second rate control value that differs from the first rate control value.

17. The one or more non-transitory computer readable media of any of clauses 11-16, wherein generating the first encoded media sequence comprises generating a plurality of encoded media sequences based on a first plurality of encoded subsequences that includes the first encoded subsequence and a second plurality of encoded subsequences that includes the second encoded subsequence; and selecting the first encoded media sequence from the plurality of encoded media sequences based on a first target value for a media metric.

18. The one or more non-transitory computer readable media of any of clauses 11-17, wherein the media title comprises at least one of video content and audio content.

19. The one or more non-transitory computer readable media of any of clauses 11-18, wherein each subsequence included in the plurality of subsequences comprises at least one shot.

20. In some embodiments, a system comprises one or more memories storing instructions; and one or more processors that are coupled to the one or more memories and, when executing the instructions, are configured to partition a source sequence associated with a media title into a plurality of subsequences; encode a first subsequence included in the plurality of subsequences across each encoder included in a plurality of encoders, each resolution included in a plurality of resolutions, and each rate control value included in a plurality of rate control values to generate a first plurality of encoded subsequences; encode a second subsequence included in the plurality of subsequences across each encoder included in the plurality of encoders, each resolution included in the plurality of resolutions, and each rate control value included in the plurality of rate control values to generate a second plurality of encoded subsequences; generate a plurality of encoded media sequences based on the first plurality of encoded subsequences and the second plurality of encoded subsequences; and select a first encoded media sequence from the plurality of encoded media sequences based on a first target value for a media metric to subsequently stream to a first endpoint device during playback of the media title.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
generating a plurality of subsequences based on a source sequence associated with a media title;
encoding a first subsequence included in the plurality of subsequences across each configured encoder included in a plurality of configured encoders and at least one rate control value to generate a first plurality of encoded subsequences, wherein each configured encoder included in the plurality of configured encoders is associated with a combination of an encoder and a configuration, wherein the configuration specifies an encoding standard and one or more configuration parameters for the encoding standard, wherein the one or more configuration parameters are implemented by the encoder to effect the encoding standard, and wherein at least two configured encoders included in the plurality of configured encoders are different from one another;
encoding a second subsequence included in the plurality of subsequences across each configured encoder in the plurality of configured encoders and the at least one rate control value to generate a second plurality of encoded subsequences;
generating a plurality of encoded media sequences based on the first plurality of encoded subsequences and the second plurality of encoded subsequences, wherein a first encoded media sequence included in the plurality of encoded media sequences includes a first encoded subsequence selected from a first convex hull associated with the first plurality of encoded subsequences and a second encoded subsequence selected from a second convex hull associated with the second plurality of encoded subsequences; and
selecting a first encoded media sequence from the plurality of encoded media sequences based on a first target value for a media metric to subsequently stream to a first endpoint device during playback of the media title.

2. The computer-implemented method of claim 1, wherein a first configured encoder included in the plurality of configured encoders is associated with a first encoder, and a second configured encoder included in the plurality of configured encoders is associated with a second encoder that differs from the first encoder.

3. The computer-implemented method of claim 1, wherein a first configured encoder included in the plurality of configured encoders is associated with a first encoding standard, a second configured encoder included in the plurality of configured encoders is associated with a second encoding standard that differs from the first encoding standard, and further comprising indicating to the first endpoint device that the first encoded media sequence is associated with multiple encoding standards.

4. The computer-implemented method of claim 1, wherein a first configured encoder included in the plurality of configured encoders is associated with a first encoder and a first value for a configuration parameter, and a second configured encoder included in the plurality of configured encoders is associated with the first encoder and a second value for the configuration parameter.

5. The computer-implemented method of claim 1, wherein a first configured encoder included in the plurality of configured encoders is associated with a first configuration that specifies at least one of a profile level, an analysis level, a search level, a psycho-visual option, a performance option, or a tuning option.

6. The computer-implemented method of claim 1, wherein generating the plurality of encoded media sequences comprises:
    generating the first convex hull based on the first plurality of encoded subsequences;
    generating the second convex hull based on the second plurality of encoded subsequences; and
    performing one or more optimization operations based on the first convex hull and the second convex hull to generate the plurality of encoded media sequences.

7. The computer-implemented method of claim 1, wherein, when encoding the first subsequence, a first configured encoder included in the plurality of configured encoders, for each rate control value included in the at least one rate control value, encodes the first subsequence based on the rate control value to generate a different encoded subsequence included in the first plurality of encoded subsequences.

8. The computer-implemented method of claim 1, wherein encoding the first subsequence comprises:
    for each resolution included in a plurality of resolutions, sampling the first subsequence to generate a different sampled subsequence; and
    for each different sampled subsequence, encoding the sampled subsequence across each configured encoder included in the plurality of configured encoders and at the at least one rate control value to generate a different plurality of encoded subsequences included in the first plurality of encoded subsequences.

9. The computer-implemented method of claim 1, further comprising selecting a second encoded media sequence from the plurality of encoded media sequences based on a second target value for the media metric to subsequently stream to a second endpoint device during playback of the media title.

10. The computer-implemented method of claim 1, wherein the media metric comprises a bitrate, a distortion metric, a peak signal-to-noise-ratio (PSNR), a linear media multimethod assessment fusion (VMAF) metric, a harmonic VMAF (VMAFh) metric, or an audio quality metric.

11. One or more non-transitory computer readable media including instructions that, when executed by one or more processors, cause the one or more processors to perform the steps of:
    partitioning a source subsequence associated with a media title into a plurality of subsequences;
    generating a first encoded subsequence that is associated with a first subsequence included in the plurality of subsequences, a first configuration specifying a first encoding standard and one or more configuration parameters for the first encoding standard, and a first encoder that implements the one or more configuration parameters to effect the first encoding standard;
    generating a second encoded subsequence that is associated with a second subsequence included in the plurality of subsequences, a second configuration specifying a second encoding standard and one or more additional configuration parameters for the second encoding standard, and a second encoder that implements the one or more additional configuration parameters to effect the second encoding standard; and
    generating a first encoded media sequence based on a first selection of the first encoded subsequence from a first convex hull associated with a first plurality of encoded subsequences and a second selection of the second encoded subsequence from a second convex hull associated with a second plurality of encoded subsequences, wherein at least a portion of the first encoded media sequence is subsequently streamed to a first endpoint device during playback of the media title.

12. The one or more non-transitory computer readable media of claim 11, wherein the instructions further cause the one or more processors to perform the step of indicating to the first endpoint device that the first encoded media sequence is associated with multiple encoding standards.

13. The one or more non-transitory computer readable media of claim 11, wherein the first configuration specifies at least one of a profile level, an analysis level, a search level, a psycho-visual option, a performance option, or a tuning option.

14. The one or more non-transitory computer readable media of claim 11, wherein generating the first encoded subsequence comprises encoding the first subsequence across each encoder included in a plurality of encoders that includes the first encoder to generate a first plurality of encoded subsequences that includes the first encoded subsequence.

15. The one or more non-transitory computer readable media of claim 11, wherein generating the first encoded media sequence comprises:
    generating the first convex hull based on the first plurality of encoded subsequences that includes the first encoded subsequence;
    generating the second convex hull based on the second plurality of encoded subsequences that includes the second encoded subsequence; and
    performing one or more optimization operations based on the first convex hull and the second convex hull to generate the first encoded media sequence.

16. The one or more non-transitory computer readable media of claim 11, wherein, the first encoded subsequence is associated with a first resolution and a first rate control value, and the second encoded subsequence is associated with a second resolution that differs from the first resolution and a second rate control value that differs from the first rate control value.

17. The one or more non-transitory computer readable media of claim 11, wherein generating the first encoded media sequence comprises:
    generating a plurality of encoded media sequences based on the first plurality of encoded subsequences that includes the first encoded subsequence and the second plurality of encoded subsequences that includes the second encoded subsequence; and
    selecting the first encoded media sequence from the plurality of encoded media sequences based on a first target value for a media metric.

18. The one or more non-transitory computer readable media of claim 11, wherein the media title comprises at least one of video content and audio content.

19. The one or more non-transitory computer readable media of claim 11, wherein each subsequence included in the plurality of subsequences comprises at least one shot.

20. A system, comprising:
    one or more memories storing instructions; and
    one or more processors that are coupled to the one or more memories and, when executing the instructions, are configured to:
        partition a source sequence associated with a media title into a plurality of subsequences;
        encode a first subsequence included in the plurality of subsequences across each encoder included in a plurality of encoders, each resolution included in a plurality of resolutions, and each rate control value included in a plurality of rate control values to generate a first plurality of encoded subsequences, wherein each encoder included in the plurality of encoders is associated with a configuration, wherein the configuration specifies an encoding standard and one or more configuration parameters for the encoding standard, and wherein the one or more configuration parameters are implemented by the encoder to effect the encoding standard;

encode a second subsequence included in the plurality of subsequences across each encoder included in the plurality of encoders, each resolution included in the plurality of resolutions, and each rate control value included in the plurality of rate control values to generate a second plurality of encoded subsequences;

generate a plurality of encoded media sequences based on the first plurality of encoded subsequences and the second plurality of encoded subsequences, wherein a first encoded media sequence included in the plurality of encoded media sequences includes the first encoded subsequence selected from a first convex hull associated with the first plurality of encoded subsequences and the second encoded subsequence selected from a second convex hull associated with the second plurality of encoded subsequences; and select a first encoded media sequence from the plurality of encoded media sequences based on a first target value for a media metric to subsequently stream to a first endpoint device during playback of the media title.

* * * * *